(12) United States Patent
Austrheim

(10) Patent No.: US 12,214,960 B2
(45) Date of Patent: Feb. 4, 2025

(54) SERVICE VEHICLE

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 733 days.

(21) Appl. No.: 17/423,425

(22) PCT Filed: Dec. 5, 2019

(86) PCT No.: PCT/EP2019/083872
§ 371 (c)(1),
(2) Date: Jul. 15, 2021

(87) PCT Pub. No.: WO2020/151866
PCT Pub. Date: Jul. 30, 2020

(65) Prior Publication Data
US 2022/0097967 A1 Mar. 31, 2022

(30) Foreign Application Priority Data

Jan. 23, 2019 (NO) .................................... 20190089

(51) Int. Cl.
*B65G 1/04* (2006.01)
(52) U.S. Cl.
CPC ......... *B65G 1/0492* (2013.01); *B65G 1/0464* (2013.01); *B65G 1/0478* (2013.01)
(58) Field of Classification Search
CPC ... B65G 1/0492; B65G 1/0464; B65G 1/0478
See application file for complete search history.

(56) References Cited

U.S. PATENT DOCUMENTS 11,279,569 B1 * 3/2022 Theobald ............. B65G 47/912
2018/0194571 A1 7/2018 Fryer et al.
(Continued)

FOREIGN PATENT DOCUMENTS

| CN | 1160672 A | 10/1997 |
| CN | 105593842 A | 5/2016 |

(Continued)

OTHER PUBLICATIONS

International Search Report issued in PCT/EP2019/083872 on Mar. 20, 2020 (4 pages).

(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A service vehicle moves on a rail system including a first set of parallel rails arranged in a horizontal plane and extending in a first direction and a second set of parallel rails arranged in the horizontal plane and extending in a second direction which is orthogonal to the first direction. The first and second sets of rails form a grid pattern in the horizontal plane including a plurality of adjacent grid cells. The service vehicle includes a container handling vehicle part for storing a container handling vehicle operating on the rail system, and wheels for allowing movement of the service vehicle along the rail system during operation. The service vehicle further includes a displacement mechanism, and a hoist arrangement connected to the displacement mechanism. The displacement mechanism and the hoist arrangement are configured for moving the container handling vehicle between an operational position on the rail system and a loaded position within the container handling vehicle part.

23 Claims, 27 Drawing Sheets

(56) References Cited

U.S. PATENT DOCUMENTS

| | | | | |
|---|---|---|---|---|
| 2021/0155409 | A1* | 5/2021 | Haid | B65G 65/00 |
| 2021/0188549 | A1* | 6/2021 | Fjeldheim | B65G 1/0464 |
| 2021/0198041 | A1* | 7/2021 | Austrheim | B65G 1/1375 |
| 2021/0214199 | A1* | 7/2021 | Austrheim | B62D 63/02 |
| 2021/0354922 | A1* | 11/2021 | Gravelle | B65G 1/0478 |
| 2022/0002076 | A1* | 1/2022 | Austrheim | B65G 1/04 |
| 2022/0009712 | A1* | 1/2022 | Kilibarda | B65G 1/0492 |
| 2022/0289478 | A1* | 9/2022 | Moradnia | G05D 1/0293 |
| 2022/0297938 | A1* | 9/2022 | Austrheim | B65G 1/0414 |
| 2023/0137545 | A1* | 5/2023 | Austrheim | B65G 1/0485 |
| | | | | 414/279 |
| 2023/0174302 | A1* | 6/2023 | Austrheim | B60B 19/003 |
| | | | | 414/495 |
| 2023/0183002 | A1* | 6/2023 | Heggebø | B65G 1/065 |
| | | | | 414/279 |
| 2023/0183004 | A1* | 6/2023 | Austrheim | B65G 1/0471 |
| | | | | 414/280 |
| 2023/0271785 | A1* | 8/2023 | Gravelle | G06Q 10/087 |
| | | | | 700/216 |
| 2023/0406624 | A1* | 12/2023 | Heggebø | B65G 1/0464 |

FOREIGN PATENT DOCUMENTS

| | | |
|---|---|---|
| CN | 106414278 A | 2/2017 |
| CN | 106660703 A | 5/2017 |
| CN | 107148382 A | 9/2017 |
| CN | 107428464 A | 12/2017 |
| CN | 107934326 A | 4/2018 |
| CN | 108928588 A | 12/2018 |
| JP | 2012-043072 A | 3/2012 |
| NO | 0317366 B1 | 10/2004 |
| WO | 2014/090684 A1 | 6/2014 |
| WO | 2015/140216 A1 | 9/2015 |
| WO | 2015/193278 A1 | 12/2015 |
| WO | 2015/197709 A1 | 12/2015 |
| WO | 2017/148939 A1 | 9/2017 |

OTHER PUBLICATIONS

Written Opinion of the International Searching Authority issued in in PCT/EP2019/083872 on Mar. 20, 2020 (10 pages).

Office Action issued in Chinese Application No. 201980090115.5 mailed on Jul. 5, 2022 (11 pages).

* cited by examiner

SERVICE VEHICLE

TECHNICAL FIELD

The present invention relates to a service vehicle for transporting at least one storage container vehicle, an automated storage and retrieval system, and a method for operating a service vehicle on the system.

BACKGROUND AND PRIOR ART

FIGS. 1A and 2A disclose a typical prior art automated storage and retrieval system 1 with a framework structure 100. FIGS. 1B and 2B disclose a prior art container handling vehicle 200,300 operating the system 1 disclosed in FIGS. 1A and 2A, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types, depending on the application.

The storage grid 104 guards against horizontal movement of the containers 106 in the stacks 107, and guides vertical movement of the containers 106, but does normally not otherwise support the storage containers 106 when stacked.

The automated storage and retrieval system 1 comprises a rail system 108 arranged in a grid pattern across the top of the storage grid 104 along a horizontal plane (P), on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines. For double track rails 110,111 as shown in both FIGS. 1A and 1B, the midpoint is set by a ridge separating two parallel tracks. Hereinafter, the extent of a grid cell 122 for a grid of double track rails 110,111 is defined as the distance (length/width) up to the midpoint of each of the four framing rail sections. Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301, where a first set of four wheels enable the lateral movement of the container handling vehicles 200,300 in the X direction and a second set of the remaining four wheels enable the lateral movement in the Y direction. One or both sets of wheels 201,301 in the wheel arrangement can be lifted and lowered so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z orthogonal to the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 2A, $Z=8$ identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell $X=10$, $Y=2$, $Z=3$. The container handling vehicles 200,300 can be said to travel in layer $Z=0$ and each grid column can be identified by its X and Y coordinates.

Each container handling vehicle 200,300 comprises a storage compartment or space (not shown) for receiving and stowing a storage container 106 when transporting the storage container 106 across the rail system 108.

The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles may have a footprint which is larger than the lateral area defined by a grid column 112, e.g. as is disclosed in WO2014/090684A1.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to an access station (not shown) where the storage containers 106 can be accessed from outside of the grid 104 or transferred out of or into the grid 104. Within the art, such a location is normally referred to as a "port" and the grid column in which the port is located may be referred to as a "port column" 119,120.

The storage grids 104 in FIGS. 1A and 2A comprise two port columns 119 and 120. The first port column 119 may for example be designated as a drop-off port column where the container handling vehicles 200,300 can drop off storage containers 106 to be transported to an access or a transfer station, and the second port column 120 may be designated as a pick-up port column where the container handling vehicles 200,300 can pick up storage containers 106 that have been transported to the storage grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. However, it is also envisaged to provide ports which transfer storage containers out of or into the storage grid 104, e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A problem associated with known automated storage and retrieval systems 1 is that it is challenging for personnel to access the rail system 108 for carrying out inspection, or to carry out maintenance of or to remove malfunctioning container handling vehicles 200,300.

WO 2015/140216A1 discloses a service vehicle for cleaning the grid and for inspection of the grid. The service vehicle is arranged with a releasable latching mechanism for docking with a malfunctioning container handling vehicle. After connecting with the vehicle, the service vehicle brings the vehicle to a designated location on the grid for inspection and maintenance by pulling or pushing. This publication also suggests an overhead carrying arrangement for removing a malfunctioning vehicle from the grid. In this arrangement either a bridge-shaped robotic vehicle or two robotic vehicles connected with a cross beam are arranged with a device for lifting the malfunctioning vehicle from the grid. The malfunctioning vehicle is carried in an elevated position to the designated location. In addition, the publication suggests that the service vehicle may be arranged with a seat for carrying a user to inspect and carry out maintenance. The personnel carrying version of the service vehicle may be manually operated by the user, or alternatively remotely controlled by the control system.

However, these known service vehicles have several disadvantages. For example, they rely on connecting the service vehicle to the container handling vehicle in question, an operation that necessitates modification of the container handling vehicle, thereby increasing the cost. Further, the prior art solution requires that the malfunctioning vehicle is guided along the rails. Hence, it is a risk that the maintenance operation will fail if the problem at least indirectly associated with the propulsion means/wheels of the malfunctioning vehicle. For example, if one or more of the wheels of the malfunctioning vehicle is jammed, it may be difficult to maneuver the vehicle along the rails.

The operation of the prior art service vehicle may also prove unreliable since it requires a successful and stable coupling between the service vehicle and the malfunctioning vehicle. In addition, the push or pull method is cumbersome, adding operational time spent by the service vehicle on the rail system.

Further, the disclosed unmanned service vehicle is dependent on bringing the container handling vehicle to a predetermined position reachable for personnel, Hence, it does not allow further service, maintenance and/or control at the malfunctioning position of the container handling vehicle.

The alternative manned service vehicle disclosed in the prior art has no possibility of transporting a malfunctioning container handling vehicle to another predetermined position. Its disclosed design also represents a clear hazard for the personnel since it shows no safety equipment preventing the personnel for being injured due to the hazards set by the surrounding storage system.

In view of the above, it is desirable to provide a service vehicle, an automated storage and retrieval system using such a service vehicle, and a method thereof, that solve or at least mitigate one or more of the aforementioned problems related to use of prior art storage and retrieval systems.

SUMMARY OF THE INVENTION

The present invention is set forth and characterized in the independent claims, while the dependent claims describe other characteristics of the invention.

In one aspect the invention concerns a service vehicle suitable for movement on a rail system comprising a first set of parallel rails arranged in a horizontal plane (P) and extending in a first direction (X) and a second set of parallel rails arranged in the horizontal plane (P) and extending in a second direction (Y) which is orthogonal to the first direction (X). The first and second sets of rails form a grid pattern in the horizontal plane (P) comprising a plurality of adjacent grid cells. The rails are preferably double-track rails.

The service vehicle comprises a container handling vehicle part for storing a container handling vehicle operating on the rail system and wheels for allowing movement of the service vehicle along the rail system during operation.

If double-track rails are used, the wheels are preferably arranged such that they are located on the inner track of the rails. However, they may also be arranged such that the service vehicle is moving onto the rail system with its wheels in the outer track of the rails.

The service vehicle further comprises a displacement mechanism and a hoist arrangement connected to the displacement mechanism. The displacement mechanism and the hoist arrangement are configured such that the container handling vehicles may be moved between an operational position on the rail system and a loaded position at least partly, and preferably fully, within the container handling vehicle part.

The displacement mechanism may for example comprise one or more displaceable beams arranged at the upper part of the service vehicle and/or a horizontally slidable plate or tiltable plate arranged at the lower part of the service vehicle.

The service vehicle may further comprise a chassis onto which the wheels are rotationally connected and an upper portion which at least partly encloses a space/volume above the chassis. The horizontal area of this at least partly enclosed space is preferably equal to or within the total horizontal extent set up by the chassis and the wheels.

Further, the upper portion may comprise a base configured to support a container handling vehicle. Such a base may be fixed or horizontally displaceable in the first direction (X) and/or the second direction (Y). The upper portion may further comprise a base comprising a container handling vehicle base configured to support a container handling vehicle and a cab floor configured to contain at least one adult person in an upright position, side walls and a rear wall attached to the side walls. The side walls and the rear wall) may in this configuration enclose a space in the horizontal plane covering at least the cab floor. The side walls may also extend into the container handling vehicle base. The latter base may be fixed to the cab floor. Alternatively, the container handling vehicle base may be horizontally slideable relative to the cab floor and/or tiltable relative to the cab floor. The height of the side walls and the rear wall are preferably at least 90 cm above the cab floor, more preferably at least 110 cm, for example 150 cm.

At least a section of the side walls and/or at least a section of the rear wall may be made of transparent panels making it possible for the operator to see through.

The upper portion may also comprise an inspection door allowing an operator located within the upper portion to have direct access to the underlying rail system during operation.

The service vehicle may further comprise a rotatable connection interconnecting the upper portion and the underlying chassis, for example, so as to provide a turnable platform. Such a configuration allows the upper portion to rotate relative to the chassis. For example, if the upper portion may move 180° relative to the chassis, it would render picking up container handling vehicle on opposite sides of the service vehicle along the rail system possible, without necessitating horizontal movements of the entire service vehicle.

The hoist arrangement may comprise an attachment device configured to be releasably fixed to the container handling vehicle. One example of such an attachment device may be a lifting claw which preferably is configured such that the distance from one end of the lifting claw to the other end of the lifting claw in its fully open position corresponds at least to the minimum horizontal extent of one container handling vehicle operating on the rail system.

Attachment devices other than lifting claws may be envisaged such as hooks, rings, slings, magnets and/or vacuum pumps.

The service vehicle may further comprise a support beam fixed to the upper portion and the displacement mechanism is connected such that it is movable along the support beam. In this way the hoist arrangement may be displaced between the operational position where the attachment device is located above the container handling vehicle to be transferred and the loaded position where the attachment device is located within the container handling vehicle part.

The displacement mechanism may comprise two first displacement beams directed along the longitudinal direction of the support beam and a second displacement beam fixed as a crossbeam to the first displacement beams, and where the hoist arrangement is connected, preferably moveable, to the second displacement beam.

The displacement mechanism may further be configured for being displaced in the horizontal plane (P) relative to the wheels.

The wheels may comprise a first set of wheels for engaging with the first set of parallel rails to guide movement of the service vehicle in the first direction (X), a second set of wheels for engaging with the second set of parallel rails to guide movement of the service vehicle in the second direction (Y) and a lifting mechanism configured to lift the first set of wheels relative to the second set of wheels.

The service vehicle may comprise two driving units spaced apart forming a space for receiving a container handling vehicle between them and being connected to each other via the container handling vehicle part.

The two driving units are identical and arranged symmetrically relative the container handling vehicle part.

The hoist arrangement comprising at least 2 framing plates configured to be moved down along two opposite sides of the container handling vehicle part, wherein the at least two plate comprises an attachment mechanism for connection to the container handling vehicle.

The service vehicle may be remotely operated.

In a second aspect the invention concerns an automated storage and retrieval system.

The system comprises a rail system comprising a first set of parallel rails arranged in a horizontal plane (P) and extending in a first direction (X) and a second set of parallel rails arranged in the horizontal plane (P) and extending in a second direction (Y) which is orthogonal to the first direction (X). The first and second sets of rails form a grid pattern in the horizontal plane (P) comprising a plurality of adjacent grid cells. The system further comprises the service vehicle as described above.

The service vehicle preferably covers n×m grid cells of the rail system, where one or both of n and m are integers of at least 2.

In a third aspect the invention concerns a method for operating a service vehicle configured to move on a rail system comprising a first set of parallel rails arranged in a horizontal plane (P) and extending in a first direction (X) and a second set of parallel rails arranged in the horizontal plane (P) and extending in a second direction (Y) which is orthogonal to the first direction (X). The first and second sets of rails form a grid pattern in the horizontal plane (P) comprising a plurality of adjacent grid cells. The service vehicle comprises a container handling vehicle part for storing a container handling vehicle operating on the rail system, wheels allowing movement of the service vehicle along the rail system during operation, a displacement mechanism and a hoist arrangement connected to the displacement mechanism.

The method comprises the following steps:

guiding the service vehicle to a first position on the rail system adjacent to at least one storage container vehicle by controlling the wheels and operating the hoist arrangement and the displacement mechanism to move a container handling vehicle between an operating position on the rail system and a loaded position within the container handling vehicle part.

The method may further comprise the step of guiding the service vehicle to a predetermined second position on the rail system.

Further, the service vehicle used in the method may be in accordance with the service vehicle described above.

BRIEF DESCRIPTION OF THE DRAWINGS

The following drawings are appended to facilitate the understanding of the invention.

FIGS. 1 and 2 are perspectives view of a prior art automated storage and retrieval system, where FIG. 1A

FIG. 4 shows perspective views of the service vehicle according to FIG. 3, where

FIG. 9A shows the service vehicle approaching a container handling vehicle to be serviced and FIG. 9B shows the service vehicle surrounding the container handling vehicle.

FIG. 10A shows the service vehicle lowering a hoist arrangement around the container handling vehicle.

FIG. 11A shows the service vehicle gripping a second vertical side of the container handling vehicle by used of its hoist arrangement.

FIG. 13A shows the service vehicle surrounding a container handling vehicle to be serviced, FIG. 13B shows the service vehicle gripping the container handling vehicle by use of its hoist arrangement, and FIG. 13C shows the service vehicle raising the container handling vehicle above the rail track by use of its hoist arrangement.

DETAILED DESCRIPTION OF THE INVENTION

Figure 1A:
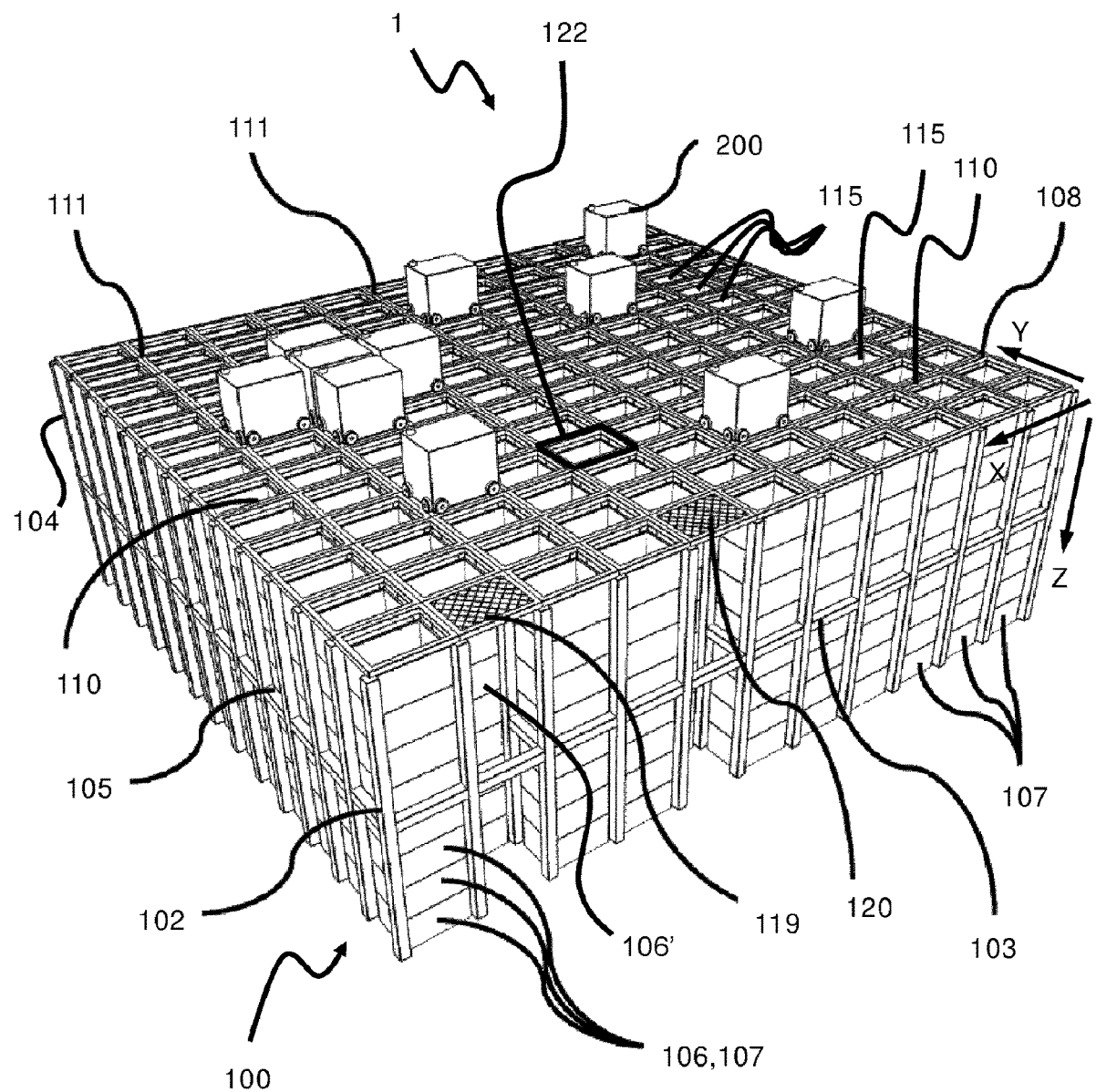

In the following, embodiments of the invention will be discussed in more detail with reference to the appended drawings. It should be understood, however, that the drawings are not intended to limit the invention to the subject-matter depicted in the drawings. The same reference numerals have been used to indicate like parts, elements or features unless otherwise explicitly stated or implicitly understood from the context.

For those parts, elements or features that have been indicated by two reference numbers, the latter reference number states the specific part, element or feature and the former number states the associated assembly or functional group.

Figure 1B:
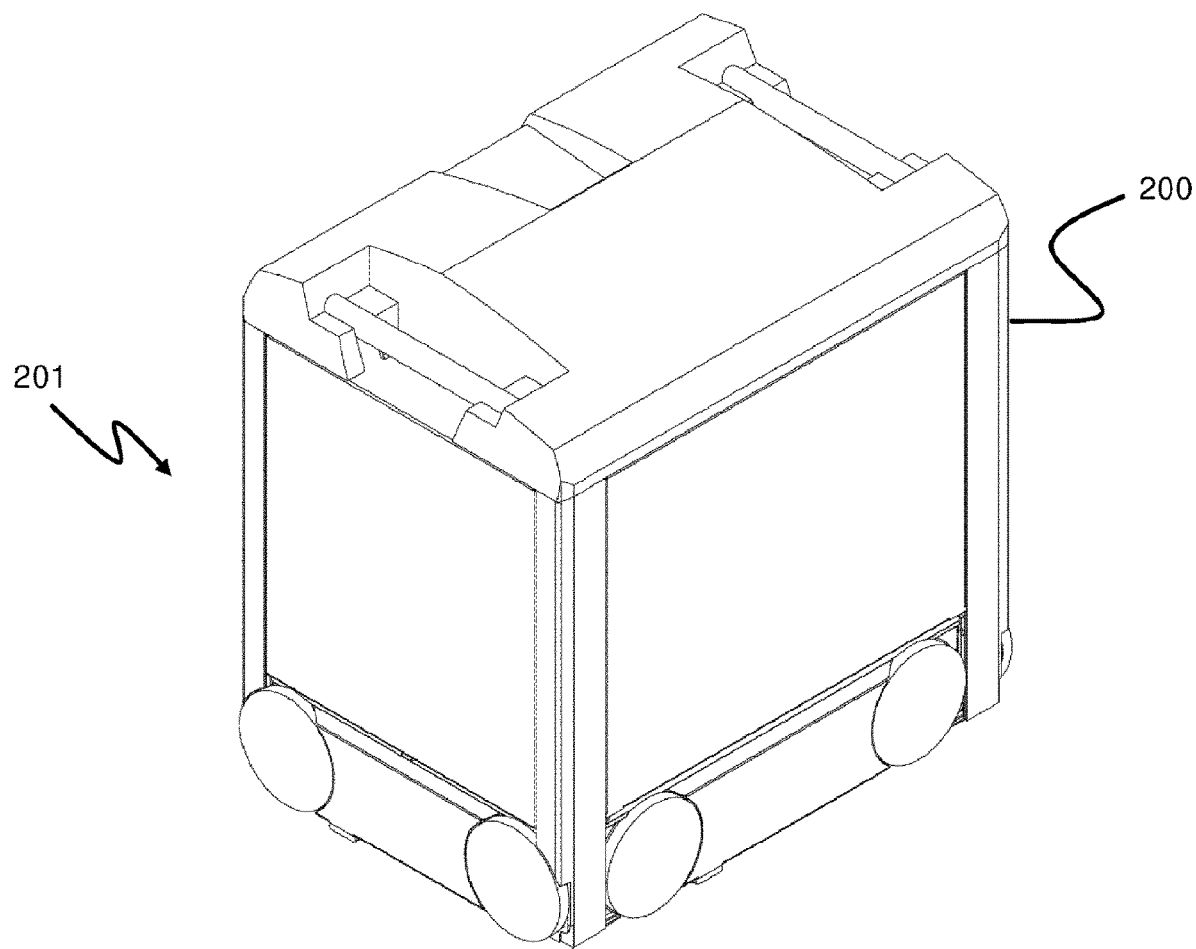
Figure 2A:
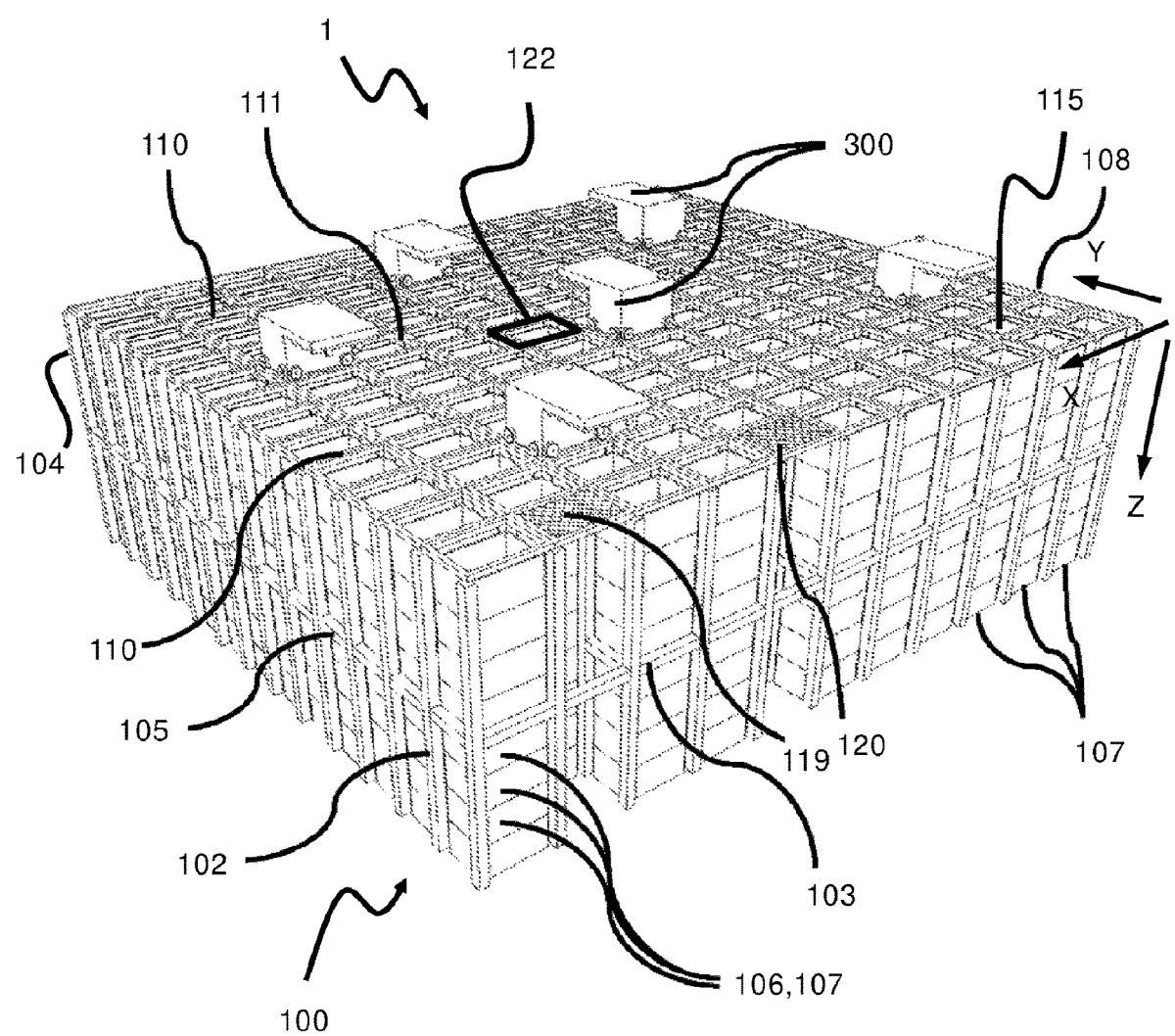
FIG. 2A shows the complete system and FIG. 1B
Figure 2B:
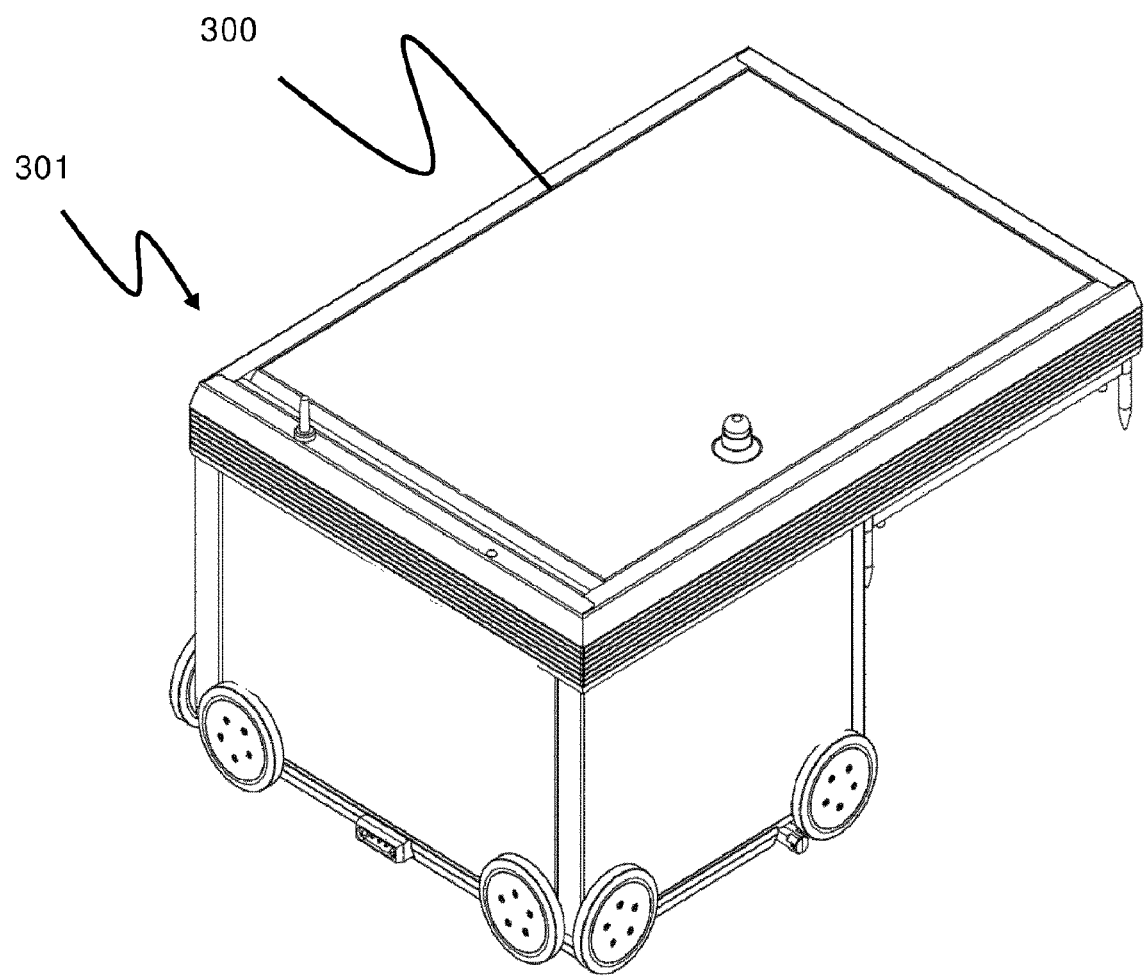
FIG. 2B shows examples of container handling vehicles for use on the system.

With reference to FIGS. 1 and 2 the storage grid 104 of each storage structure 1 constitutes a grid framework 100 of in total 143 grid columns 112, where the width and length of the grid framework 100 corresponds to the width and length of 13 and 11 grid columns 112, respectively. The top layer of the grid framework 100 is a rail system 108 onto which a plurality of container handling vehicles 200,300 are operated.

The grid framework 100 of the automated storage and retrieval system 1 according to the invention is constructed in accordance with the prior art grid framework 100 described above, i.e. a plurality of upright members 102 and optionally a plurality of horizontal members 103 which are supported by the upright members 102, and the rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively, measured from the rail's longitudinal centerline. In FIGS. 1 and 2, such a grid cell 122 is marked on the rail system 108 by thick lines.

The rail system 108 allows the container handling vehicles 200,300 to move horizontally between different grid locations, where each grid location is associated with a grid cell 122.

In FIGS. 1 and 2 the storage grid 104 is shown with a height of eight bins. It is understood, however, that the storage grid 104 can in principle be of any size. In particular, it is understood that storage grid 104 can be considerably wider and/or longer than disclosed in FIGS. 1 and 2. For example, the storage grid 104 may have a horizontal extent of more than 700×700 grid cells 122. Also, the storage grid 104 can be considerably deeper than disclosed in FIGS. 1 and 2. For example, the storage grid 104 may be more than twelve bins deep.

The container handling vehicles 200,300 may be of any type known in the art, e.g. any of the automated container handling vehicles disclosed in WO2014/090684 A1, in NO317366 and WO2015/193278A1 or other similar disclosure. The system 1 may also comprise a mixture of different container handling vehicles 200,300.

Figure 3A:
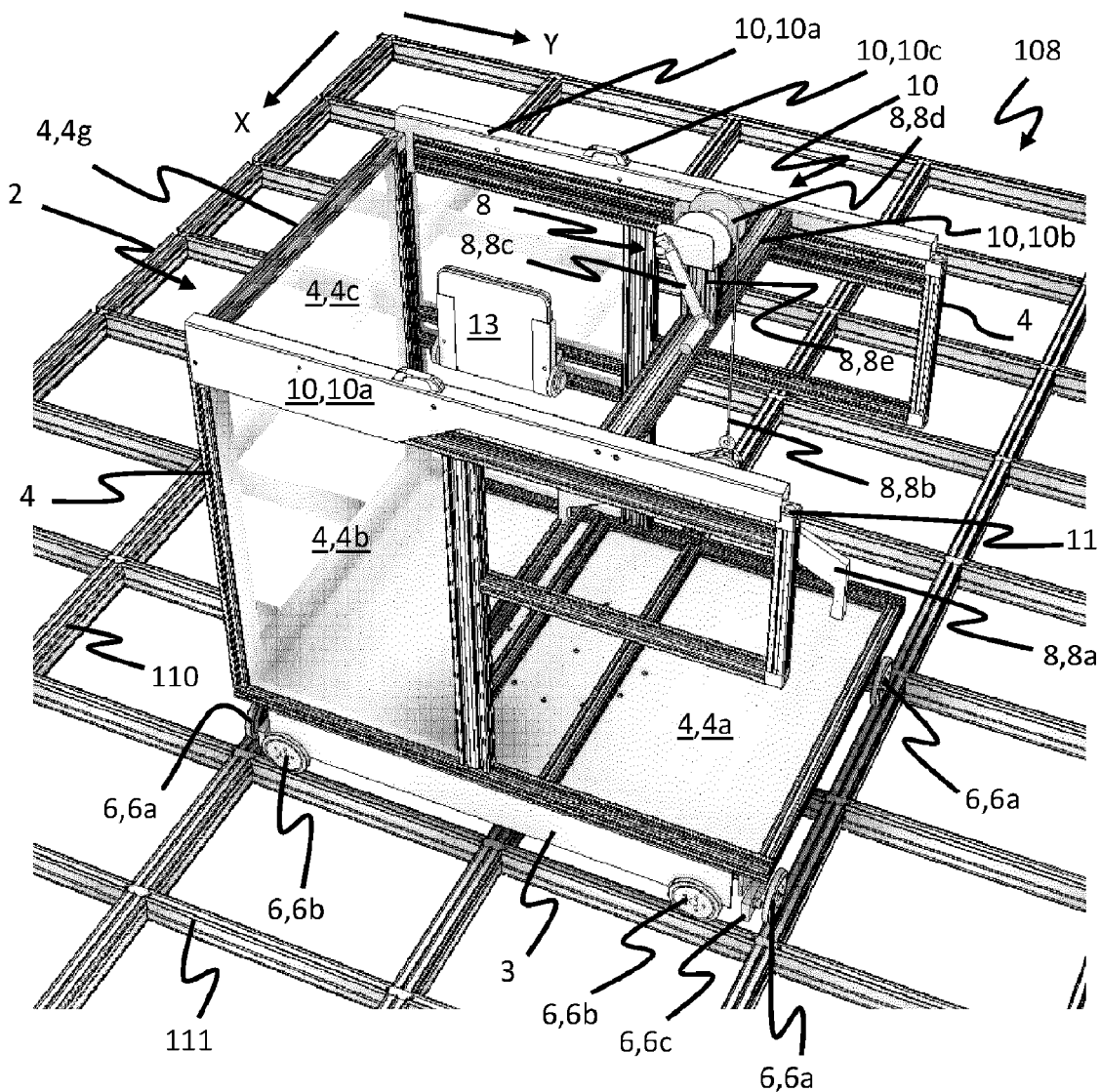
FIG. 3 shows perspective views of an exemplary service vehicle according to a first embodiment of the invention operating on a rail system of an automated storage and retrieval system having a footprint covering 2×2 grid cells, where FIG. 3A
FIG. 3B shows an upper portion of the service vehicle aligned with, and rotated relative to, the chassis of the service vehicle, respectively.
Figure 3B:
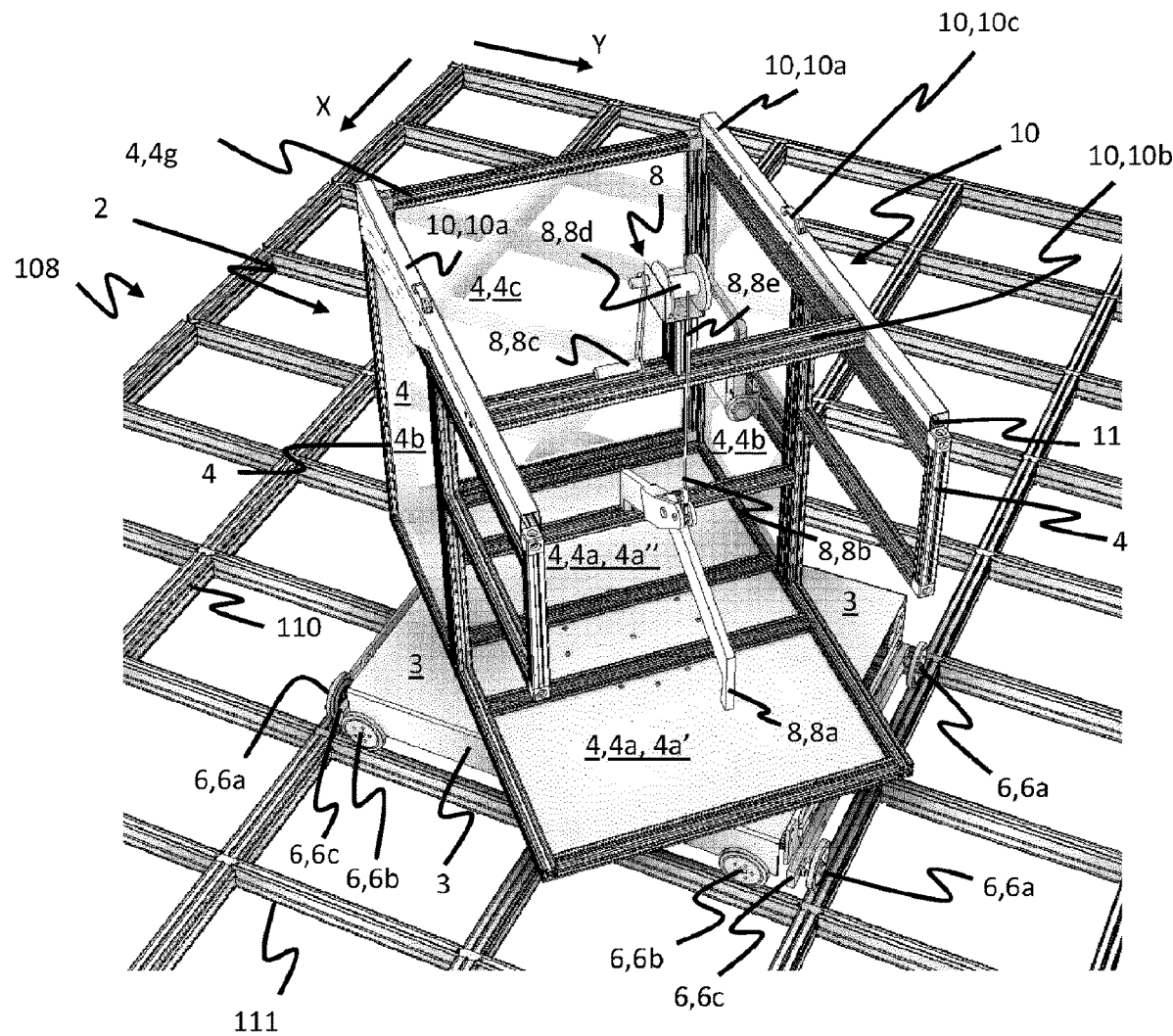
Figure 4A:
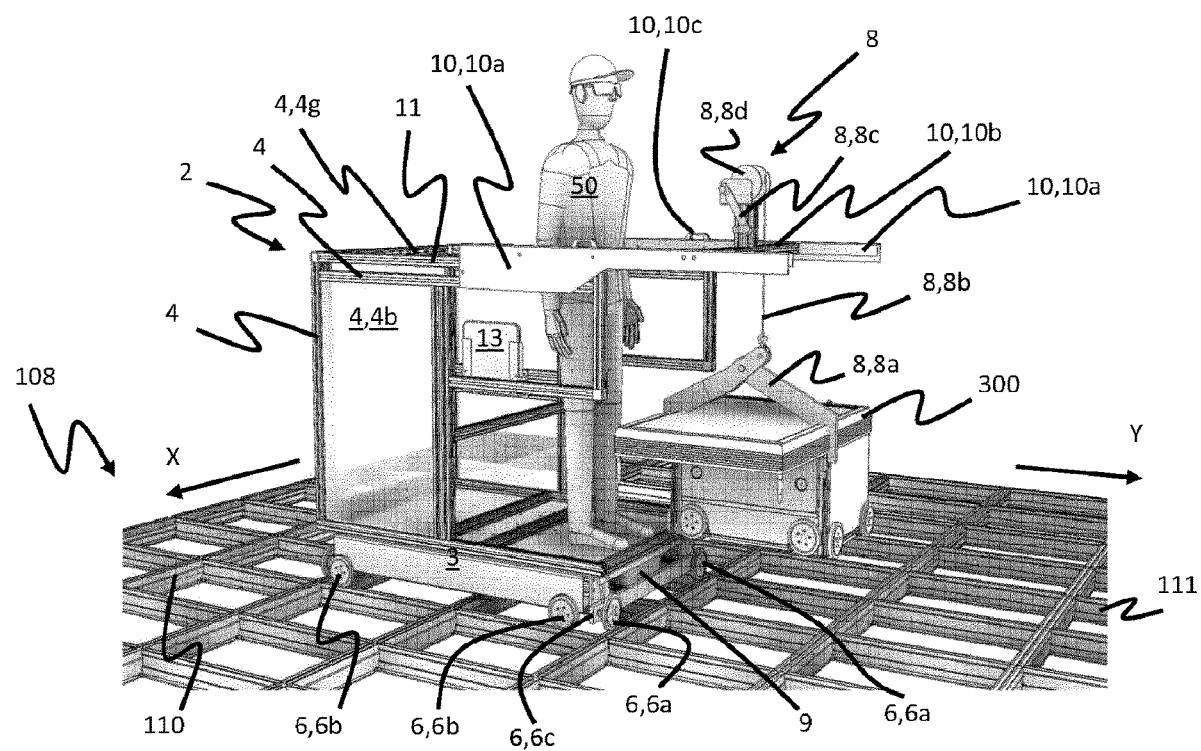
FIGS. 4A-C show a side view from the front, a side view from the back and a side view from above, respectively, of the service vehicle with a container handling vehicle to be serviced suspended above the rail system.
Figure 4B:
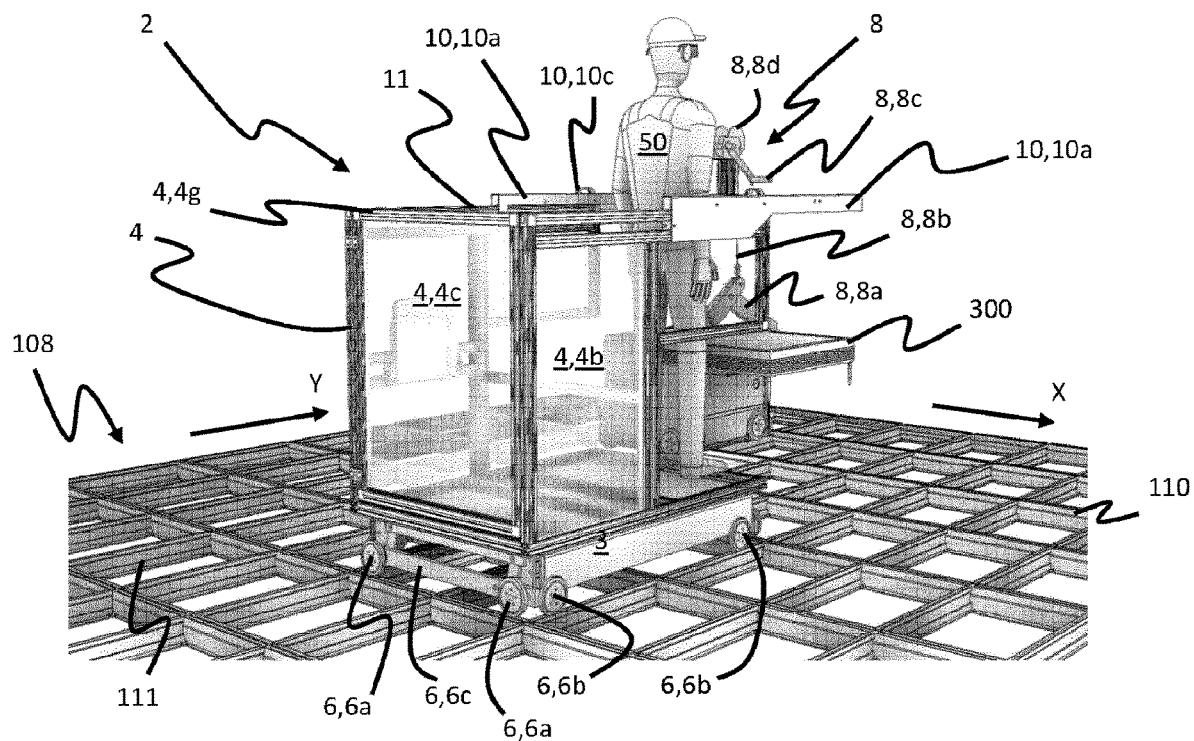
Figure 4C:
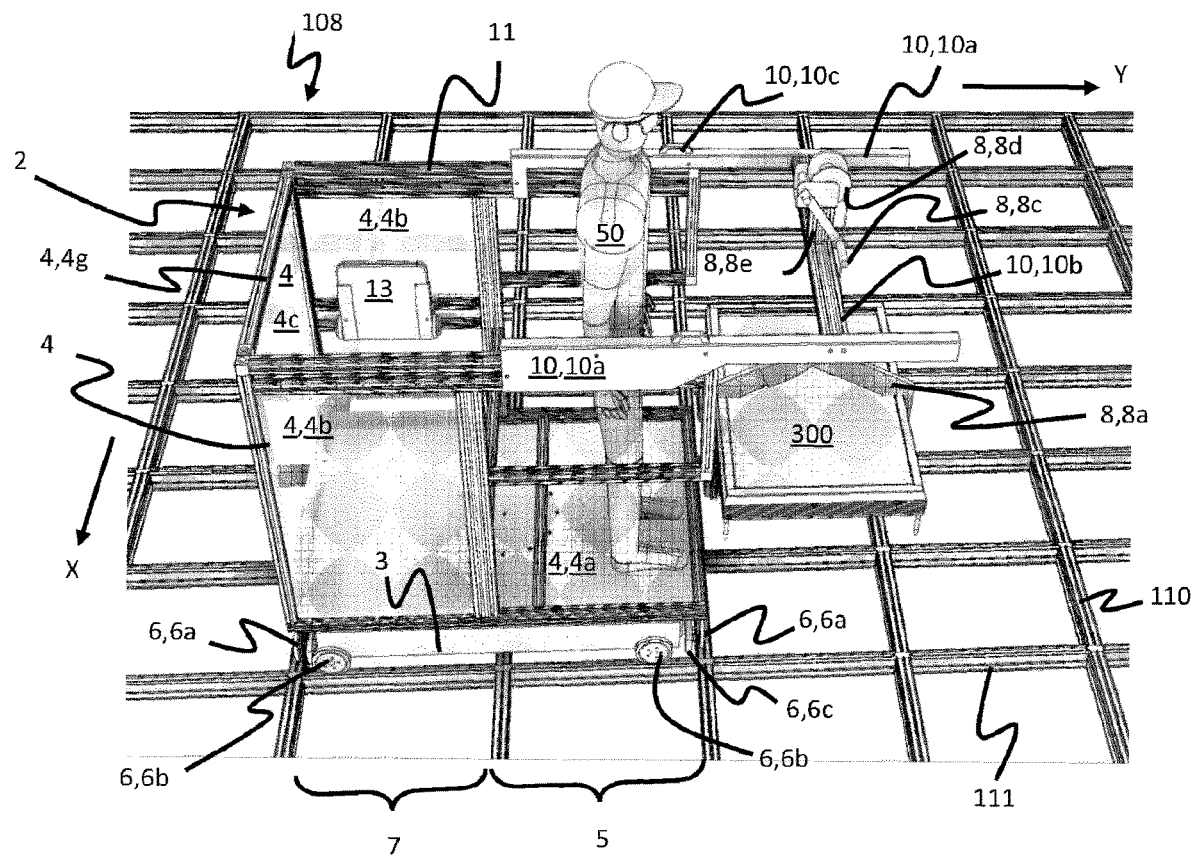
Figure 5A:
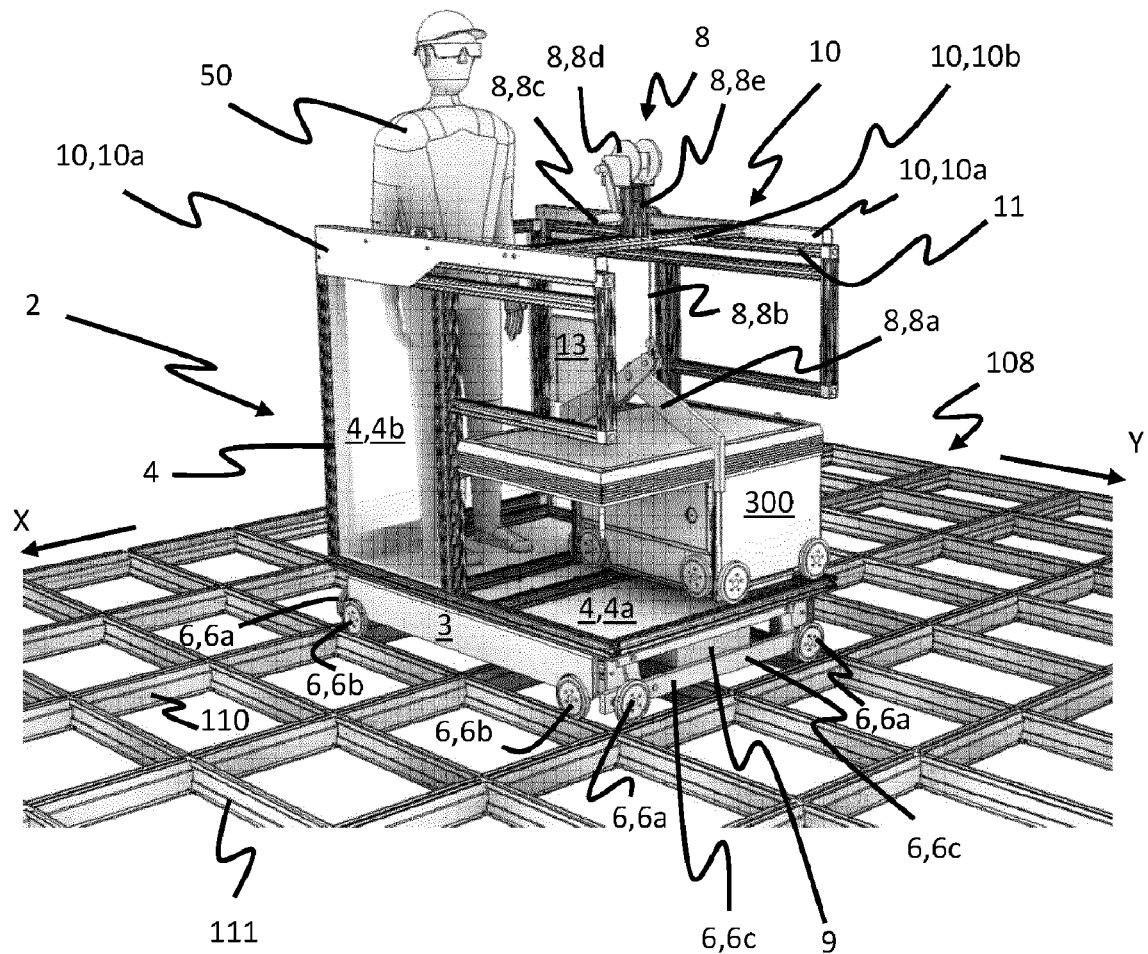
FIG. 5 shows perspective views of the service vehicle according to FIGS. 3 and 4, where FIGS. 5A and B shows the service vehicle from the side with a container handling vehicle arranged in a loaded position within a container handling vehicle part of the service vehicle.
Figure 5B:
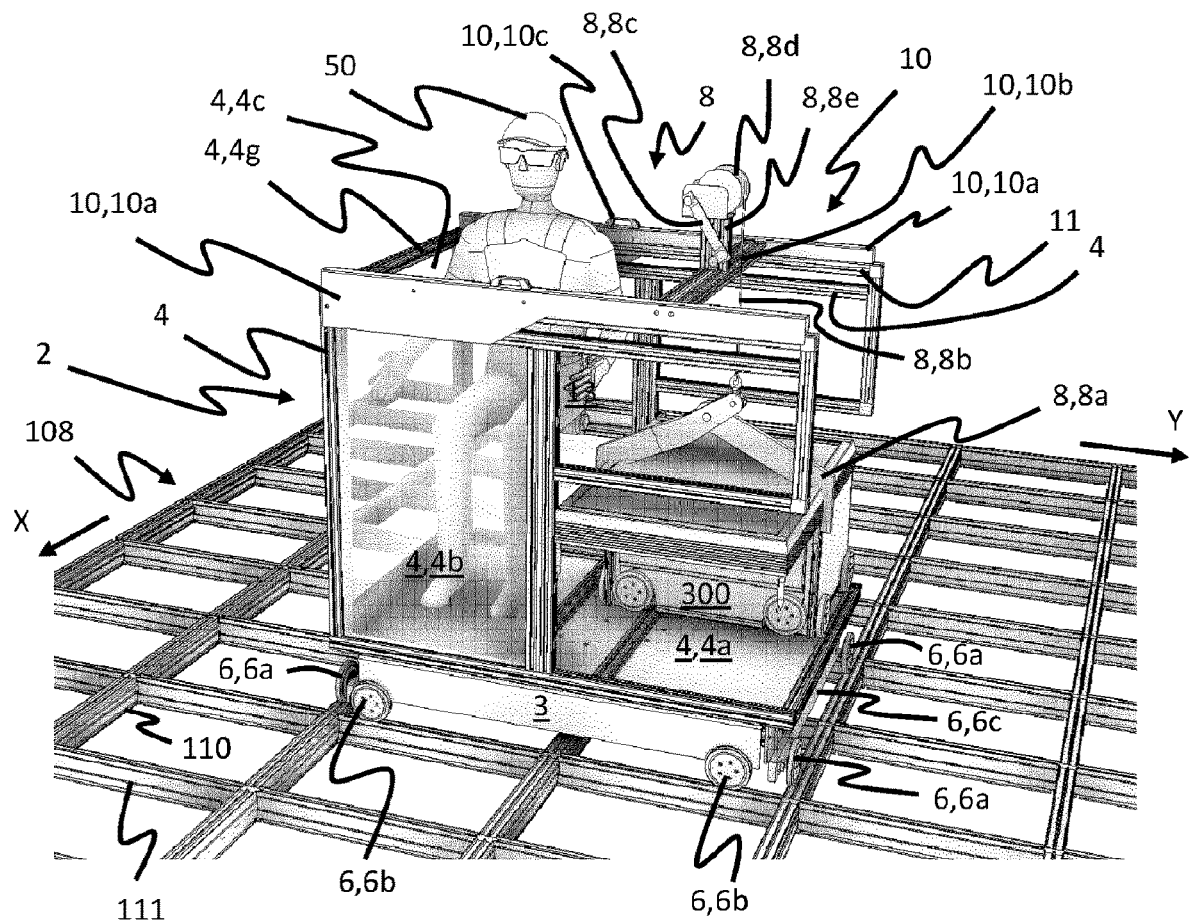

FIGS. 3-5 show a first embodiment of a service vehicle 2 arranged on the rail system 108 for inspection and/or transport of container handling vehicles 200,300.

The service vehicle 2 comprises a chassis 3 and a propulsion system 6 or wheels 6 in form of two set of wheels 6a,6b rotationally connected to the chassis 3. At least one of the wheel sets 6a,6b is linked to a wheel displacement system 6c allowing the set of wheels 6a,6b to be raised and lowered relative to the chassis 3 and/or the rail system 108. The wheels 6 may be propelled by a suitable drive motor placed for example within the chassis 3. Alternatively, or in addition, the wheels 6 may be propelled by drive motors arranged at or within one or more of the wheels 6, for example a hub motor. The drive motor may be a DC (direct current) motor, such as a brushless DC motor.

In yet another alternative or additional configuration, the propulsion system 6 may be propelled by human power such as feet and/or hand power. The latter may for example be achieved by installing one or more cranks delivering power to the propulsion system/wheels when operated.

In yet another alternative or additional configuration, the movement of the service vehicle 2 may be achieved by external systems such as traction cables running across the rail system. This alternative configuration may remove the need of a motorized propulsion system 6, allowing use of passive wheels such as trolley wheels.

An upper portion 4 is mounted on top of the chassis 3 of the service vehicle 2. The upper portion 4 may comprise a rectangular shape base 4a extending parallel to the top surface of the chassis 3, a plurality of vertical side walls/guards/rails/panels 4b arranged at two parallel sides of the base's 4a horizontal perimeter and a vertical rear wall/guard/rail/panel 4c arranged at one of the two other parallel sides of the base's 4a horizontal perimeter. Note that the shape of the base 4a of the upper portion 4 is not restricted to rectangular. It may for example also be circular, oval, etc. Further, one or more of the walls 4b,4c may be omitted.

As shown in all the figures, the sets of wheels 6a,6b may be arranged symmetrically around a vertical centerplane of the chassis 3 in its direction of movement and may protrude partly from the chassis' 3 horizontal extremity.

As best illustrated in FIG. 4B the service vehicle 2 may be divided into two parts relative to the horizontal extent of the upper portion 4;

a container vehicle handling part 5 containing any components intended to be mechanically interacting with the container handling vehicle 200,300 to be serviced and a cab-area 7 configured to contain one or more persons 50.

The task of the one or more persons may be performing control/repair of any container handling vehicles 200,300 operating on the rail system 108 in situ, and/or controlling/implementing transfer of any container handling vehicles 200,300 to be serviced between the rail system 108 and the service vehicle 2.

As seen in FIG. 3B the upper portion 4 may rotate relative to the underlying chassis 3 and wheels 6, for example by connecting the upper portion 4 to the chassis 3 via a rotatable connection. The rotatable connection may be remotely operated or be operated from within the upper portion 4, for example within the cab-area 7, or a combination of both.

By rotationally connecting the upper portion 4 to the chassis 3, an operator 50 may access the container handling vehicle 200,300 (or any other object) anywhere on the rail system 108 more easily, with higher precision and in a more time-efficient manner. The maximum allowable rotation of the upper potion 4 relative to the chassis 3 is preferably limited to 180°.

The wheels 6 may be operated by a control system onboard the service vehicle 2 or remotely operated from a control system outside the storage system 1 or a combination of both. If the control system is located onboard the service vehicle 2, any movement pattern and speed settings may be initiated and controlled by the operator 50 located inside the service vehicle 2.

In the first embodiment the container vehicle handling part 5 comprises a transfer device 8 in the form of a hoist arrangement 8 connected to a displacement mechanism 10. The latter 10 is configured to be displaceable relative to the upper portion 4, for example in a horizontal direction or a direction with a significant horizontal component.

The horizontal displacement is achieved in this first embodiment by mounting a pair of first displacement beams 10a of the displacement mechanism 10 movable along respective support beams 11 arranged above and parallel to each of the side walls 4b of the upper portion 4. A handle 10c may be fixed to one or both of the displacement beams 10a to facilitate manual displacement by the operator 50.

Alternatively, the displacement of the displacement beams 10a along the support beams 11 may be motorized, for example by operating the motor from a control system onboard the vehicle 2 or by a remote operation from a control system outside the storage system 1 or a combination of both.

The hoist arrangement 8 in the first embodiment is mounted onto a second displacement beam 10b fixed as a crossbeam to the pair of first displacement beams 10a.

When the first displacement beams 10a are in a fully retracted position, i.e. displaced horizontally as far as possible towards the rear wall 4c of the upper portion 4, the crossbeam may define a midpoint of the container handling part 5 to one side of the cab-area 7.

The hoist arrangement 8 may comprise an attachment device 8a, in the first embodiment exemplified as a lifting claw 8a, being configured to attach or grab a container handling vehicle 200,300 operating on the rail system 108. If a lifting claw 8a is used, the distance from one end of the lifting claw 8a to the other end in its fully open position should correspond at least to the minimum horizontal extent of one container handling vehicle 200,300. Note that a skilled person will understand that other type of attachment device 8a may be used, for example hooks, slings, magnets, vacuum devices, etc.

The hoist arrangement 8 may further comprise a lifting line 8b attached at one end to the attachment device 8a and the other end to any lifting mechanism 8c,d connected to the second displacement beam 10b and being capable of raising and lowering the attachment device 8a. In the figures this lifting mechanism is exemplified by a transfer drum 8d onto which the lifting line 8b is spooled and a transfer motor 8c in the form of a crank handle 8c enabling controlled rotation of the transfer drum 8d by the operator 50.

As for the displacement of the displacement mechanism 10, the raising/lowering operation may alternatively be motorized, for example by operating a motor from a control system onboard the vehicle 2 or by remotely operation from a control system outside the storage system 1 or a combination of both.

Figure 6:
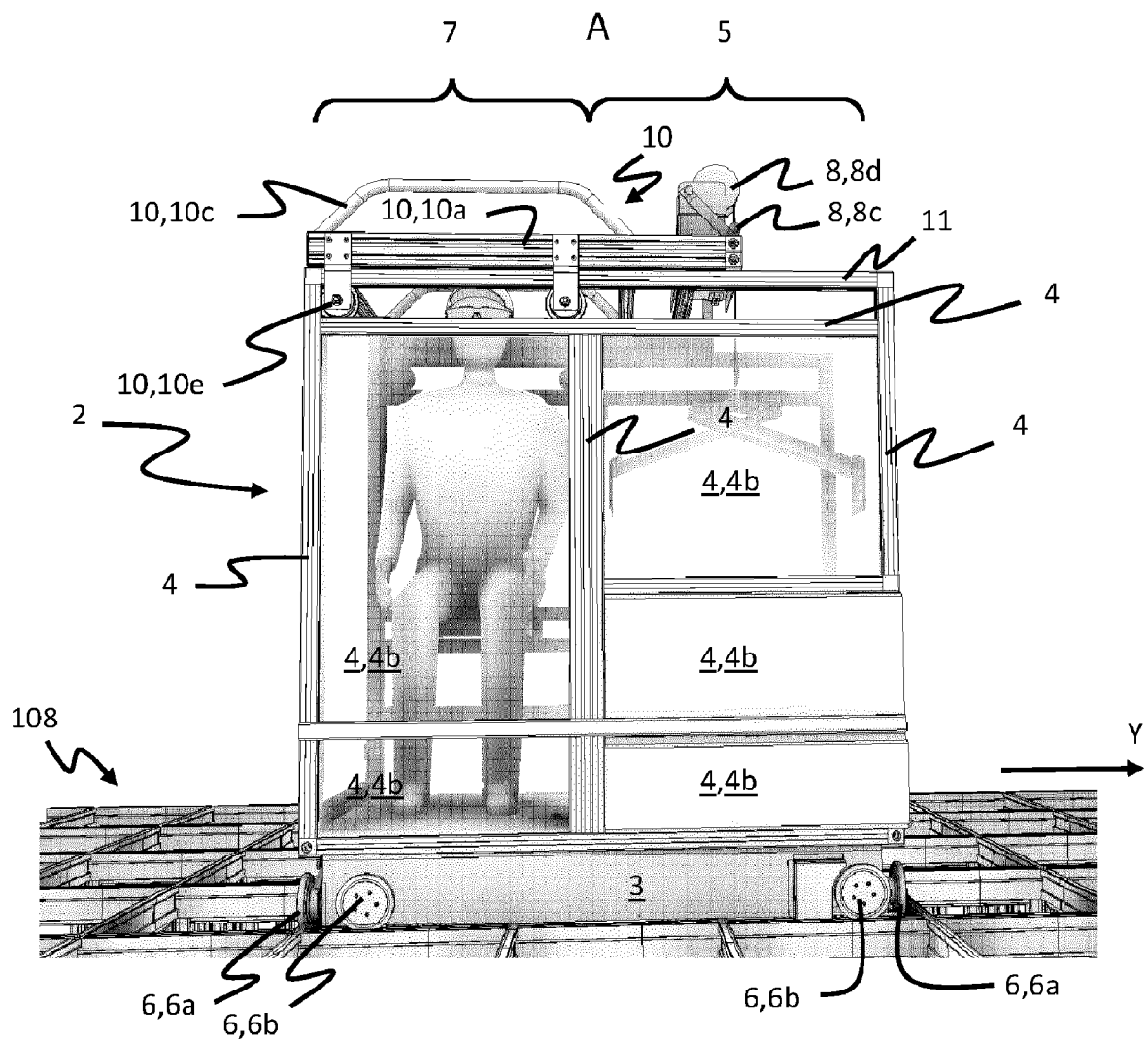
FIG. 6 shows a perspective side view of an exemplary service vehicle according to a second embodiment of the invention operating on a rail system of an automated storage and retrieval system having a footprint covering 3×3 grid cells.
Figure 7A:
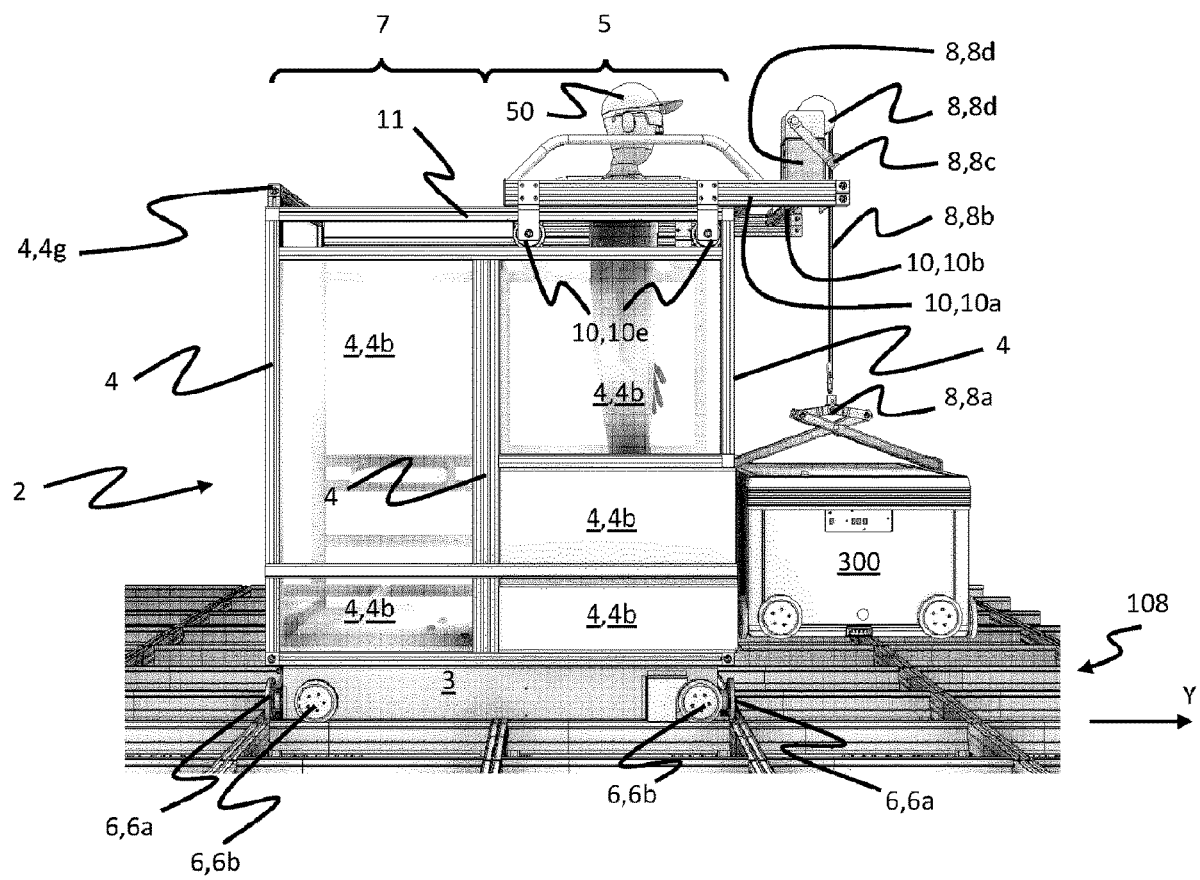
FIG. 7A shows the service vehicle from the side with the container handling vehicle to be serviced suspended above the rail system and FIGS. 7B and C show the service vehicle from the side and from the front, respectively, with the container handling vehicle to be serviced arranged in a loaded position within the container handling vehicle part of the service vehicle.
Figure 7B:
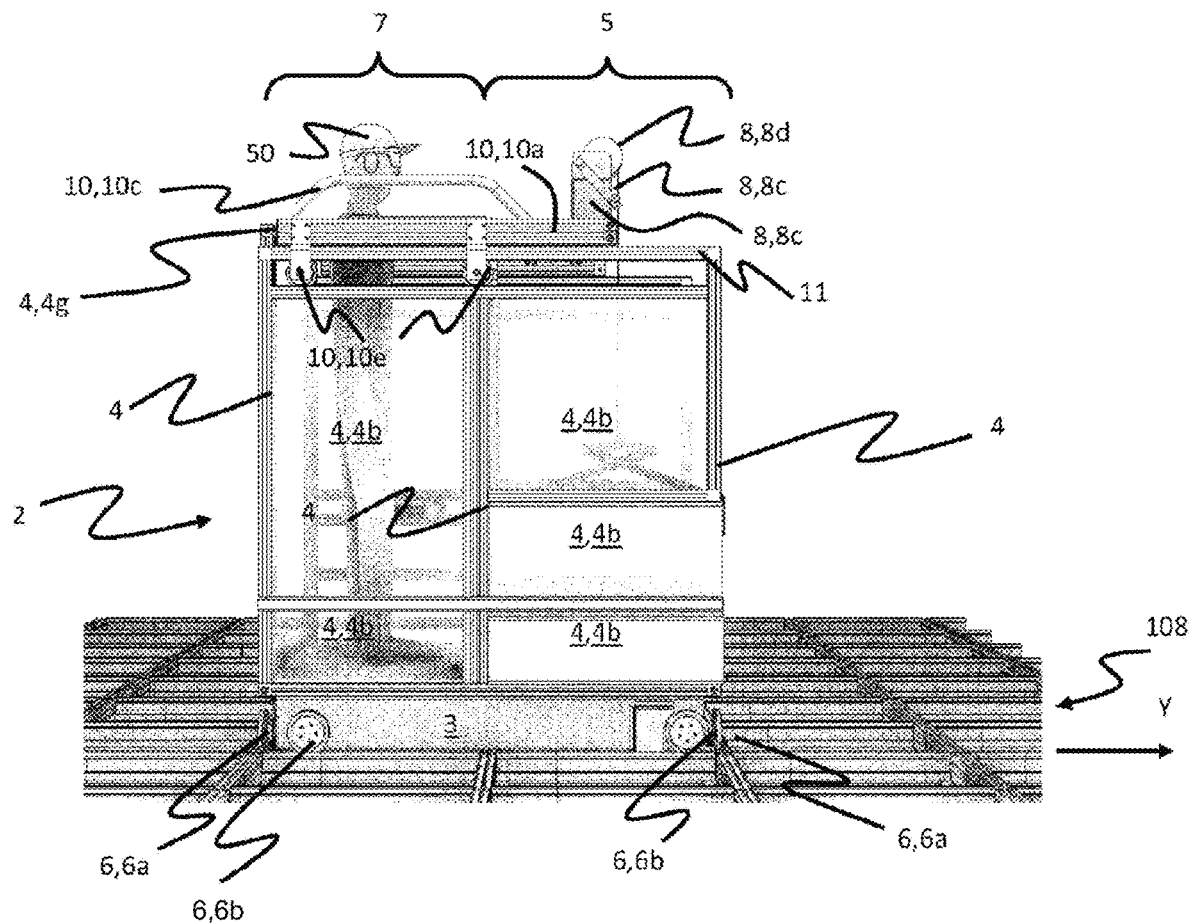
FIG. 7 shows perspective views of a service vehicle according to third embodiment of the invention having a footprint covering 2×2 grid cells, where
Figure 7C:
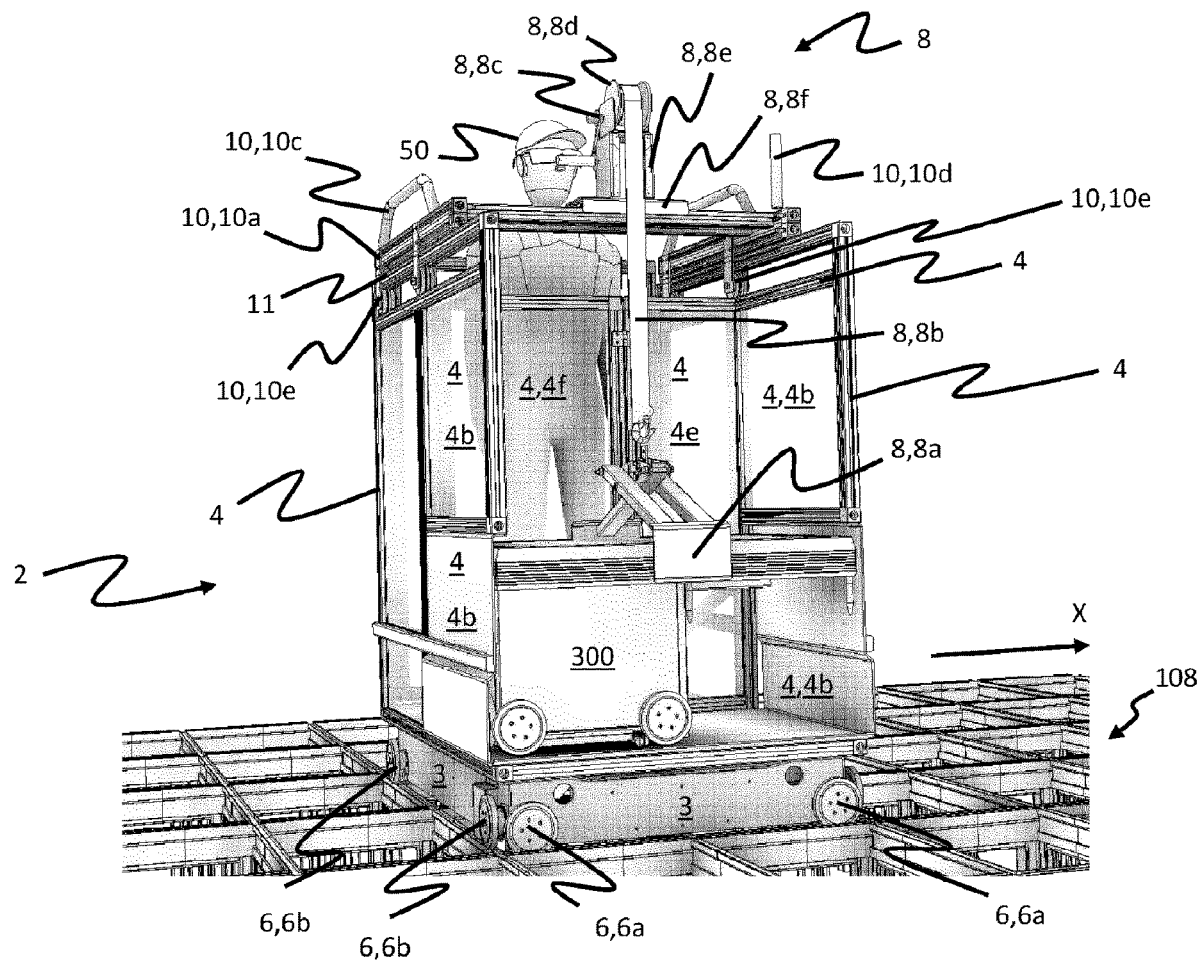
Figure 8:
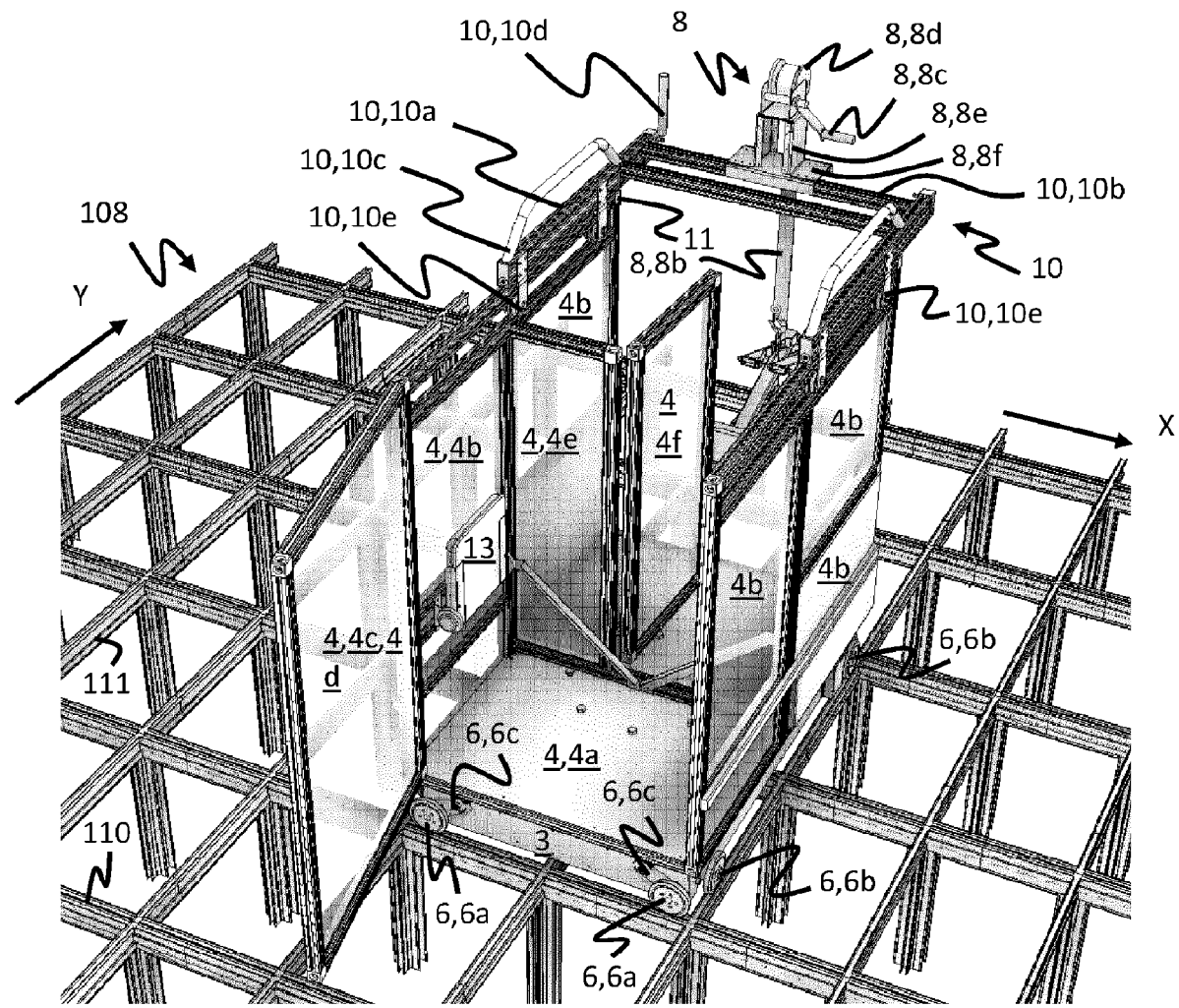
FIG. 8 shows perspective views of the service vehicle according to FIG. 7 having an access door in an open position.

The lifting mechanism 8c,d may be mounted to the second displacement beam 10b via a transfer column 8e, either fixed as shown in FIGS. 3-5, or via a transfer sliding plate 8f configured to be moveable along the second displacement beam 10b as shown in FIGS. 6-8. As for the displacement operation using the displacement mechanism 10 and the raising/lowering of the attachment device 8a using the lifting mechanism 8c,d, the movement along the second displacement beam 10b may be manually operated or motorized, for example by operating a motor from a control system onboard the vehicle 2 or by remote operation from a control system outside the storage system 1 or a combination of both.

Further, the cab-area 7 may comprise an operating system with a control stick to regulate the direction of the service vehicle 2 relative to the rail system 108 and/or a speed regulator to regulate to the speed of the service vehicle 2 relative to the rail system 108. Alternatively, or in addition, the service vehicle 2 may be remotely operated by a control system located outside the storage system 1. In this case the cab-area 7 may function as an operator space from which the operator 50 may have access to the hoist arrangement 8, the displacement mechanism 10 and optionally the rail system 108. An operator chair 13 may be installed in the cab-area 7 to allow the operator 50 to be seated during transport on the rail system 108 from the rail system's perimeter to the location of the container handling vehicle(s) 200,300 to be serviced/controlled/removed/placed.

In FIGS. 3-5 the chassis 3 and the wheels 6 of the service vehicle 2 are shown to occupy a horizontal area of the rail system 108 corresponding to 2×2 grid cells 122. However, the horizontal extent of the chassis 3 and the wheels 6 may be larger. FIG. 6 shows a second embodiment of a service vehicle having a similar configuration as the first embodiment shown in FIGS. 3-5, but with a footprint/horizontal extent covering 3×3 grid cells 122. Also other horizontal extents such as 2×3 grid cells, 3×4 grid cells, 4×4 grid cells, etc. may be envisaged.

In general, the horizontal extent of the chassis 3 may occupy a horizontal area of the rail system 108 corresponding to n×m grid cells 122, where n and m may take any integer, preferably 2, 3 or 4.

Any drive components 9 such as motor(s) for driving the displacement mechanism 10 and/or driving the hoist arrangement 8 and/or driving the wheels 6 may be arranged within the chassis 3 (see FIGS. 4A and 5A).

The procedure for collecting a malfunctioning or expected malfunctioning container handling vehicle 300 from a position on the rail system 108 to a location for service/control, preferably outside the storage system, may proceed in the following way:

(FIG. 3A) The service vehicle 2 is guided to a position such that a container handling vehicle 300 to be serviced/controlled/removed is located adjacent the side of the service vehicle 2, preferably the side closest to the hoist arrangement 8, either remotely from a control system outside the storage system 1 or by the operator 50 from within the cab-area 7 or a combination thereof. The distance from the surface vehicle 2 to the container handling vehicle 300 in question should be short enough to allow the attachment device 8a of the hoist arrangement 8 to be positioned above the container handling vehicle 300 by operating the displacement mechanism 10.

(FIG. 3B) If needed, the upper portion 4 is rotated relative to the chassis 3 and the wheels 6 to obtain the desired position of the hoist arrangement 8 relative to the grid cell 122 of the rail system 108 from where the container handling vehicle 300 is to be collected.

When the service vehicle 2 is in position, i.e. with the hoist arrangement 8 in a distance from the container handling vehicle 300 being within reach of the displacement mechanism 10, the operator 50 pushes the first displacement beams 10a of the displacement mechanism 10 forward using the displacement mechanism handle 10c from a stop beam 4g located above the rear wall 4c. The displacement of the displacement mechanism 10, and thus also the hoist arrangement 8, may be achieved by use of displacement mechanism wheels 10e (see FIGS. 6-8) fixed to the first displacement beams 10a and guided between the support beam 11 and a parallel upper beam constituting part of the service vehicle's upper portion 4.

Further adjustments of the horizontal position of the lifting claw 8a (or any other attachment device 8a) such that the lifting claw 8a is positioned above the container handling vehicle 300 in question may be achieved by adjusting the position of the first displacement beams 10a relative to the upper portion 4 and/or adjusting the position of the service vehicle 2 relative to the rail system 108 using the wheels 6 and/or rotating the upper portion 4 and the displacement mechanism 10 relative to the chassis 3 and the wheels 6 and/or, if available, moving the hoist arrangement 8 along the second displacement beam 10b (see FIGS. 6-8).

The operator 50 cranks, or releases a ratchet pawl or brake of, the lifting crank 8d (or operate any other transfer motor 8d) to lower the lifting claw 8a until the claw ends are situated on opposite sides of the container handling vehicle 300 (or on opposite sides of any other structure on the container handling vehicle 300 allowing a stable connection).

The operator 50 cranks the lifting crank 8d in the opposite direction causing the claw ends of the lifting claw 8a to press towards the side walls (and/or inserted below and/or on/into any structure of the container handling vehicle 300), thereby achieving a stable connection.

(FIG. 4) The operator 50 further cranks the lifting crank 8d to raise the container handling vehicle 300 to a height corresponding to the height of the base 4a of the upper portion 4 relative to the rail system 108, or higher.

When the container handling vehicle 300 is raised sufficiently above the rail system 108, the operator 50 retracts the first displacement beams 10a of the displacement mechanism 10 backward using the displacement mechanism handle 10c until the rear end of the first displacement beams 10a abuts the stop beam 4g located above the rear wall 4c, or at least to a position where the container handling vehicle 300 is located fully within the upper portion 4 of the service vehicle 2.

(FIG. 5) The operator 50 then cranks, or releases a ratchet pawl or brake of, the lifting crank 8d to lower the container handling vehicle 300 until it is supported onto the base 4a of the upper portion 4.

The service vehicle 2 with the container handling vehicle 300 is guided to a position at the perimeter of the rail system 108 for further handling, and/or, if possible, necessary maintenance is performed on the rail system 108.

The latter step may be omitted if the container handling vehicle 300 is serviced in situ. However, it is considered advantageous that the container handling vehicle 300 is powered on to assure that its most previous position is kept in the memory.

The procedure for placing a serviced/controlled/new container handling vehicle 200,300 onto the rail system 108 by use of the service vehicle 2 according to the first embodiment may proceed in the following way:

(FIG. 5A) The service vehicle 2 with the container handling vehicle 300 supported on the base 4a of the upper portion 4 is transported to a location on the rail system 108, either by an operator 50 within the service vehicle 2 or remotely by a control system located outside the storage system 1 or a combination thereof. The coordinate for the location is preferably pre-programmed into the container handling vehicle 300 prior to this step.

If needed, the upper portion 4 is rotated relative to the chassis 3 and the wheels 6 to obtain the desired position of the hoist arrangement 8 relative to the grid cell 122 of the rail system 108 onto which the container handling vehicle is to be placed.

(FIGS. 4A, B and C) When the hoist arrangement 8 of the service vehicle 2 is in the desired position relative to the grid cell 122, the operator 50 cranks, or releases a ratchet pawl or brake of, the crank handle 8c in order to rotate the transfer drum 8d. The rotation of the transfer drum 8d lowers the lifting claw 8a suspended in an end of the spooled lifting line 8b to a position where the two claw ends are located at opposite sides of the container handling vehicle 300 (or opposite sides of any other structure of the container handling vehicle 300) arranged on the base 4a. By cranking the crank handle 8c in the opposite direction, the claw ends will close in on the container handling vehicle 300, thereby creating a stable coupling to vehicle's 300 side walls (and/or below/within/on any other structures) of the container handling vehicle 300. The coupling between the lifting claw 8a (or any other attachment device 8a) and the container handling vehicle 300 may also be performed before and/or during the transport to the location where the transfer of the container handling vehicle 300 onto the rail system 108 should take place.

When the service vehicle 2 is in position, and a stable connection between the lifting claw 8a and the container handling vehicle 300 has been established, the operator 50 cranks the lifting crank 8d (or operate any other transfer motor 8d) to raise the container handling vehicle 300 at least partly above the base 4a of the upper portion 4. The container handling vehicle 300 may also be in a raised position prior to and/or under transportation.

The operator 50 then pushes the first displacement beams 10a of the displacement mechanism 10 forward using the displacement mechanism handle 10c from a stop beam 4a located above or along the rear wall 4c. The minimum distance that the first displacement beams 10a should be displaced during the transfer operation is the distance required for the container handling vehicle 300 to be situated fully outside the horizontal extent of the service vehicle 2, excluding the displacement mechanism 10 and the hoist arrangement 8. This minimum distance may be equal to the maximum allowed displacement distance of the displacement mechanism 10. The displacement of the displacement mechanism 10, and thus also the hoist arrangement 8, may be achieved by use of displacement mechanism wheels 10e fixed to the first displacement beams 10a and guided between the support beam 11 and a parallel upper beam constituting part of the service vehicle's upper portion 4.

When the correct horizontal position of the container handling vehicle 300 relative to the rail system 108 is achieved, the operator 50 cranks, or releases a ratchet pawl or brake of, the lifting crank 8d (or operate any other transfer motor 8d) to lower the container handling vehicle 300 onto the rail system 108.

During and/or before the lowering of the container handling vehicle 300 towards the rail system 108, the operator 50 may further adjust the horizontal position of the container handling vehicle 300 such that its wheels 301 are aligned, or almost aligned, with the corresponding rails 110,111 of the rail system 108. This horizontal repositioning may be achieved by adjusting the position of the first displacement beams 10a relative to the upper portion 4 and/or adjusting the position of the service vehicle 2 relative to the rail system 108 by use of the wheels 6 and/or rotating the upper portion 4 and the displacement mechanism 10 relative to the chassis 3 and the wheels 6 and/or, if available, moving the hoist arrangement 8 along the second displacement beam 10b (see FIGS. 6-8).

FIGS. 7-8 show a third embodiment of the inventive service vehicle 2. In this embodiment the upper portion 4 extends higher above the chassis 3/wheels 6 relative to the first and second embodiment, thus giving an increased overall safety for the operator 50 during operation on the rail system 108. The height of the displacement mechanism 10 relative to the base 4a of the upper portion 4 may be the height corresponding to the shoulder height of an average height adult male or adult female.

The upper portion 4 comprises an inner separation wall 4e and an inner access door 4f, creating a physical separation between the container vehicle handling space 5 and the cab-area 7. Such physical separation may be advisable in view of safety due to the fact that the vehicle handling part space 5 is open towards the more hazardous rail system 108.

The upper portion 4 of the third embodiment also includes an inspection door 4d forming part of, or replacing, a fixed rear wall 4c, thereby allowing the operator 50 to easily and safely enter, or get direct physical access to, the rail system 108. The inspection door 4d may be placed at alternative locations of the upper portion 4, for example into, or replacing, one of the side walls 4b. The upper portion 4 may also comprise a plurality of inspection doors 4d. FIGS. 8A and B show an example of the third embodiment where both the inner access door 4f and the inspection door 4d are opened.

In contrast to the first and second embodiments, the third embodiment also shows an example of the hoist arrangement 8 being displaceable along the second displacement beam 10b. In FIGS. 6-8 a transfer sliding plate 8f, onto which the transfer column 8e is fixed, is shown slidingly supported onto the second displacement beam 10b. However, any means allowing movement along the second displacement beam 10b may be envisaged for moving the transfer sliding plate 8f, for example the use of wheels.

As mentioned above, such displacement of the hoist arrangement 8 provides additional means for position adjustments of the attachment device 8a during handling or transfer of the container handling vehicles 200,300 to be serviced/controlled between their operational position on the rail system 108 and the transfer position on the service vehicle 2.

The procedures for both collecting a malfunctioning or expected malfunctioning container handling vehicle 300 from a position on the rail system 108 to a location for service/control, and for placing a serviced/controlled/new container handling vehicle 200,300 onto the rail system 108 by use of the service vehicle 2 according to the third embodiment, may proceed as for the service vehicle 2 according to the first and second embodiments.

The term attachment device 8a should be interpreted to include any gripping mechanism capable of gripping a container handling vehicle 200,300 for the purpose of lifting/lowering such as a gripping claw, hook, magnet and/or vacuum device.

Further, the attachment device 8a is coupled to a lifting arrangement 8c,d that may be any kind of arrangement enabling vertical movement of the attachment device 8a. In addition to the illustrated transfer drum 8d with its crank handle 8c, the lifting arrangement may for example comprise one or more linear actuators driving a frame onto which the attachment device 8*a* is mounted.

The general design of the attachment device 8*a* should be such that coupling with any exterior design of the relevant container handling vehicle(s) 200,300 is feasible.

The operation of the attachment device 8*a* may, as described above, be controlled manually by the operator 50. However, automatic operation from an onboard control system, and/or by a remote operation controlled by a control system situated outside the storage system 1, may also be envisaged.

FIGS. 9-12 and FIGS. 13-14 show respectively a fourth and a fifth embodiment of the invention where the service vehicle 2 is configured for approaching and surrounding at least one container handling vehicle 200,300 to be serviced.

In these embodiments, the service vehicle 2 may grip and raise the container handling vehicle 200,300 above the rail system 108 by use of a hoist arrangement 8. Once in a raised position within the service vehicle 2 and above the rail system 108, the at least one vehicle 200,300 can be transferred and/or inspected. For example, the at least one vehicle may be transported to another location on the rail system 108 for inspection/repair, such as a service area, or for other purposes. Alternatively, the task of control/repair of the vehicle 200,300 may be carried out on the rail system in situ.

These embodiments present an advantage over the previous embodiments in that the service vehicle 2 of the fourth and fifth embodiments have a substantially more symmetrical configuration, thereby increasing stability of the service vehicle and making it more suitable for lifting and transporting heavy container handling vehicle 200,300.

Figure 9A:
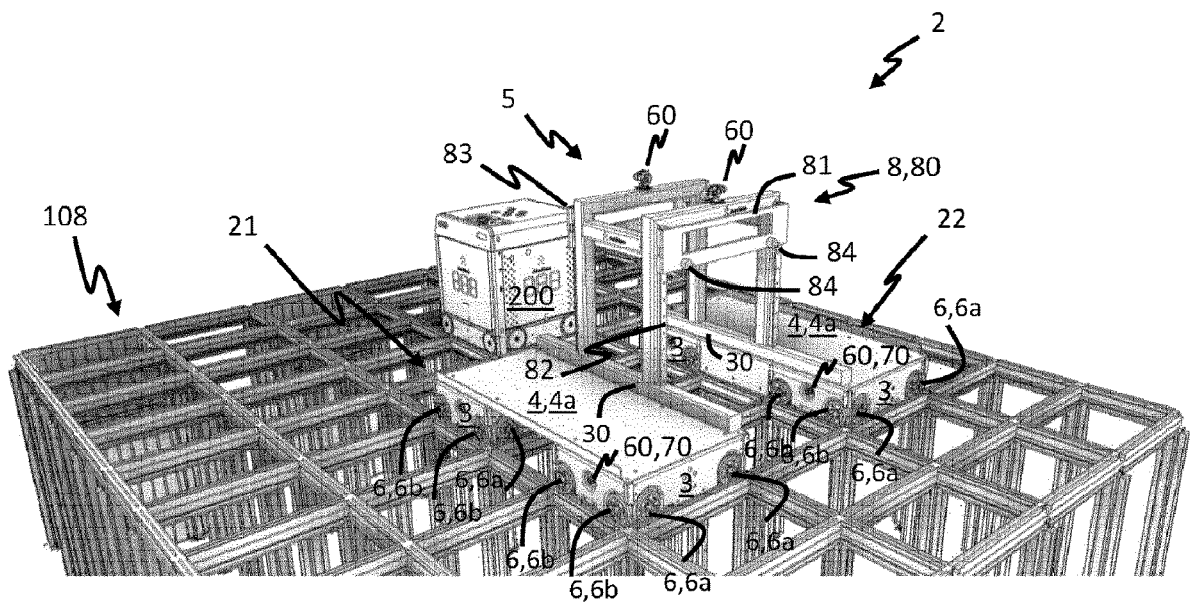
FIGS. 9A and B show a perspective view of a service vehicle according to the fourth embodiment of the invention, where
Figure 9B:
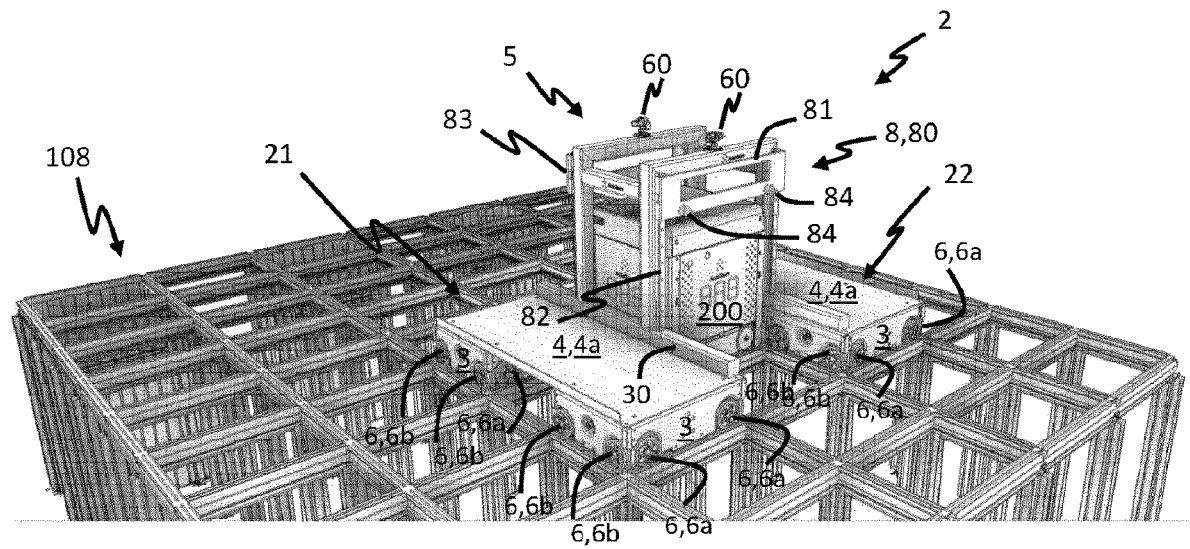
Figure 10A:
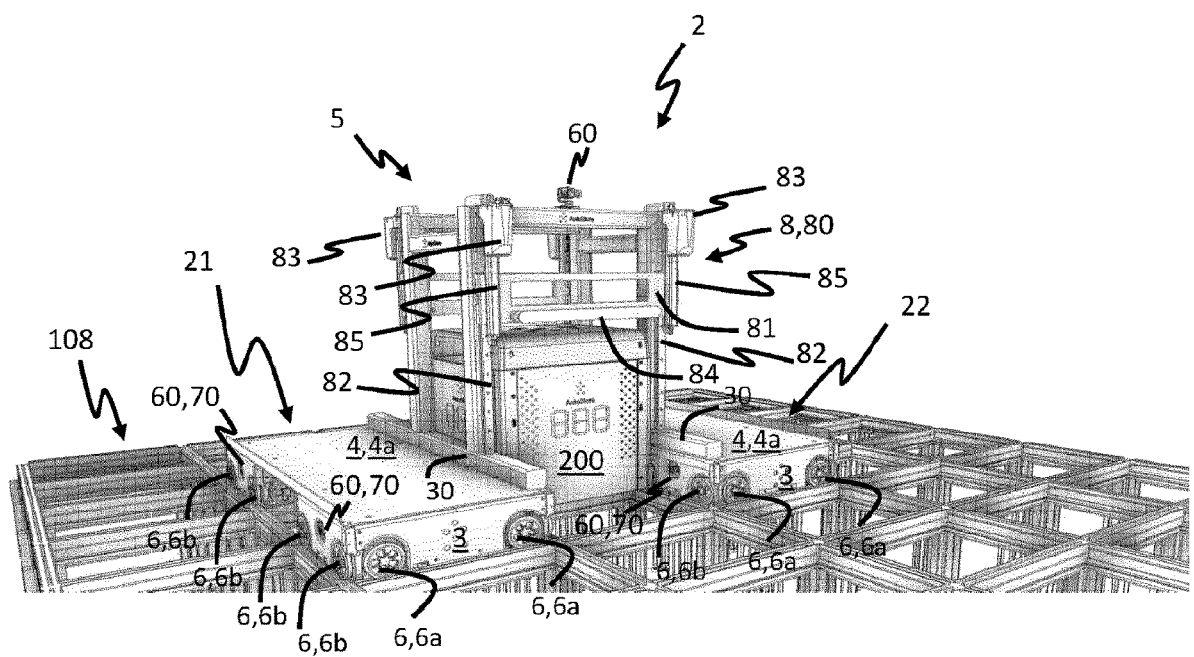
FIGS. 10A and B show a perspective view of the service vehicle of FIG. 9, where
Figure 10B:
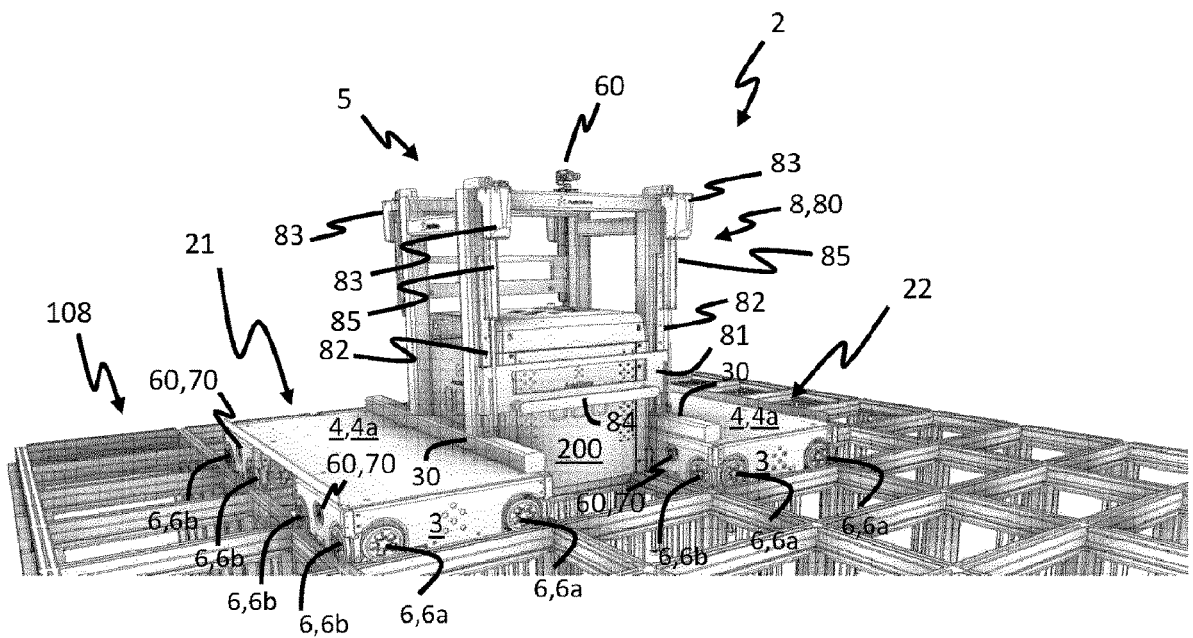
FIG. 10B shows the service vehicle gripping one vertical side of the container handling vehicle to ensure the correct positioning of the container handling vehicle relative to the service vehicle.
Figure 11A:
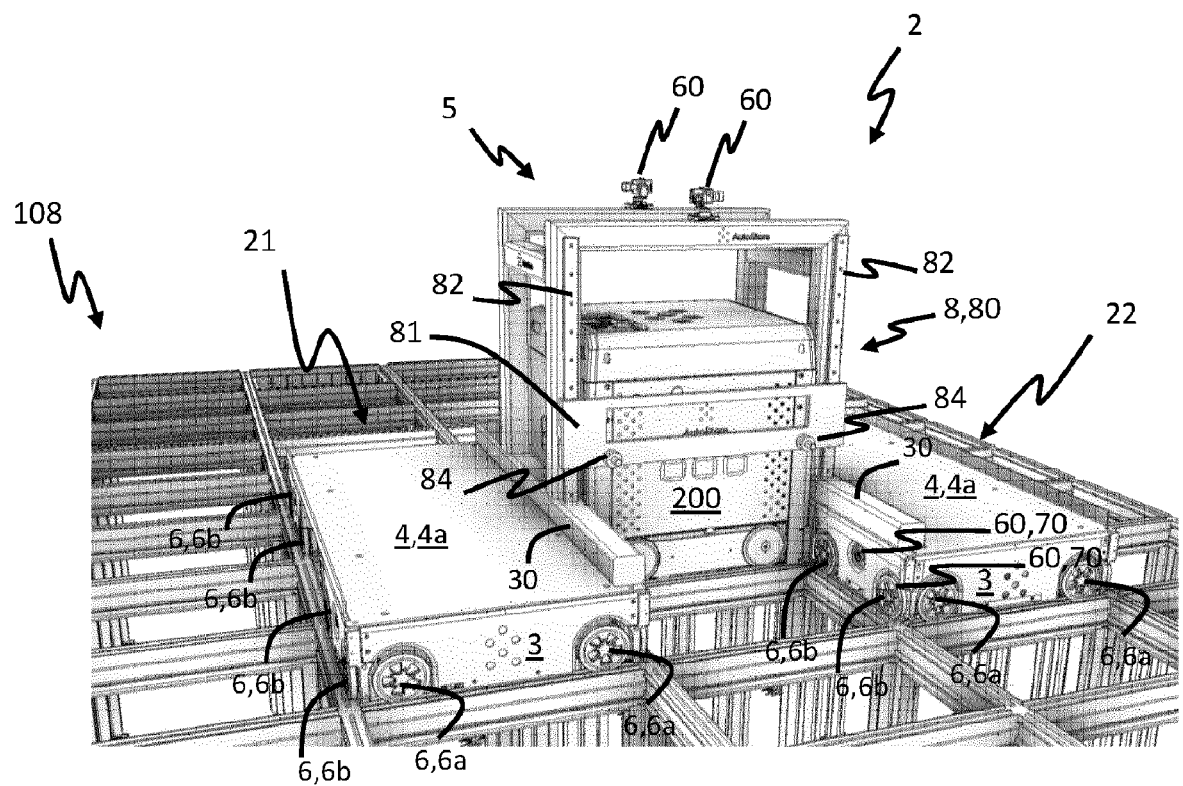
FIGS. 11A and B shows a perspective view of the service vehicle of FIG. 9, where

As shown on FIGS. 9-11, the service vehicle 2 of these embodiments may be operated automatically or remotely, hence may not require an operator 50 to be onboard the service vehicle 2. Alternatively, the vehicle 2 may be operated by an operator 50 onboard the vehicle 2 as best illustrated in FIGS. 13-14.

FIGS. 9-11 show the fourth embodiment of the service vehicle 2 according to the invention. The service vehicle is arranged on the rail system 108 for inspection and/or transport of container handling vehicle 200,300.

In this embodiment, the operation of the service vehicle 2 is configured such that a human operator 50 is not needed onboard the service vehicle 2 when in use.

Further, the service vehicle 2 may be configured to allow a human operator 50 to remotely operate the service vehicle 2. Alternatively, the operation of the service vehicle can be fully automated without interaction with a human operator 50.

The service vehicle 2 of the fourth embodiment comprises a container handling vehicle part 5 for storing a container handling vehicle 200,300 to be serviced and two driving units 21,22. The first and second driving units 21,22 are coupled to two opposite vertical sides of a container handling vehicle part 5. At least one of the two other vertical sides of the container handling vehicle part 5 is configured to receive at least one container handling vehicle 200,300 to be serviced.

The two driving units 21,22 comprise at least one chassis 3 onto which wheels 6 are rotationally connected for allowing movement of the service vehicle 2 along the rail system during operation. The service vehicle 2 further comprises a displacement mechanism 10 and hoist arrangement 8 configured to move the container handling vehicles 200,300 between an operational position on the rail system and a loaded position at partly, and preferably fully, within the container handling vehicle part 5.

Figure 11B:
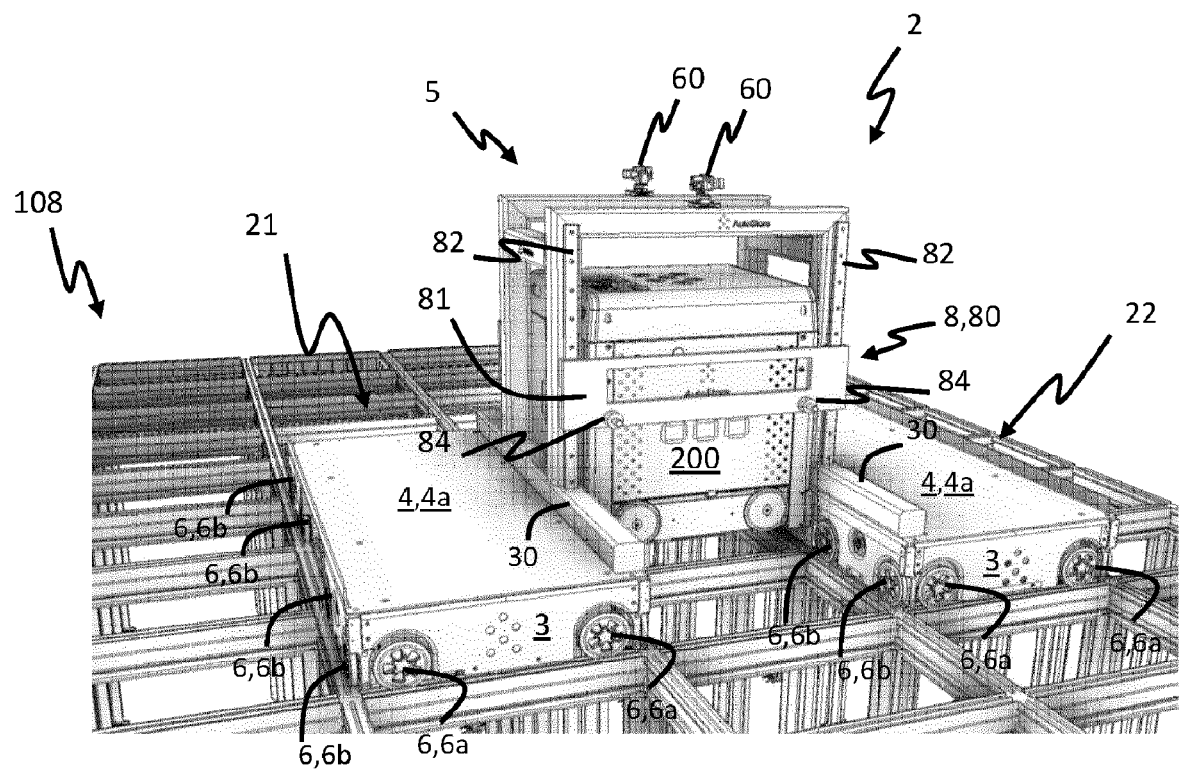
FIG. 11B shows the service vehicle raising the container handling vehicle above the rail system.

FIG. 9A shows the service vehicle 2 of the fourth embodiment approaching a container handling vehicle 200,300 to be serviced and FIG. 9B shows the service vehicle 2 surrounding the container handling vehicle 200,300. As the service vehicle is surrounding the vehicle 200,300, a first part of its hoist arrangement 8 may be lowered along a vertical side of the container handling vehicle 200,300 and configured to grip a vehicle 200,300 vertical side to ensure the correct positioning of the service vehicle 2 relative to the vehicle 200,300, as shown in FIG. 10A. A second part of the transfer device 8 may be lowered along the opposite vertical side of the vehicle 200,300 as shown in FIG. 11 to securely grip the vehicle 200,300. The vehicle 200,300 may then be raised above the rail system 108 by use the hoist arrangement 8 as shown in FIG. 11B. The vehicle 200,300 may then be serviced, inspected and/or transported to another location.

FIG. 9-11 show a particular configuration where the container handling vehicle part 5 is in a form of a framework with four vertical sides and a top horizontal side. In FIG. 9-11 the container handling vehicle part 5 has two vertical sides of the container handling vehicle part 5 configured for receiving the vehicle 200,300 and for surrounding at least one vehicle 200,300.

In another alternative configuration, the driving units 21,22 may have an opening in to allow the container handling vehicle part 5 to receive at least one container through all its vertical sides of the container handling vehicle 5.

The driving units 21,22 with a length L are preferably arranged at least partly below the container handling vehicle part 5. The first and second driving units are preferably identical and arranged parallel to each other to ensure a symmetric configuration of the service vehicle 2, thereby increased stability in comparison to the previous embodiments.

As shown in FIG. 9-11, the first and second driving units 21,22 may also advantageously be connected symmetrically around a vertical centerplane of the container handling vehicle part 5 in the vehicle 2 direction of movement and may be protruding at least partly from the horizontal extremity of the container handling vehicle part 5.

The driving units 21,22 comprises at least one chassis 3 onto which wheels 6 in form of in form of two set of wheels 6*a*,6*b* rotationally connected to the at least chassis 3. At least one of the wheel sets 6*a*,6*b* is linked to a wheel displacement system 6*c* allowing the set of wheels 6*a*,6*b* to be raised and lowered relative to the chassis 3 and/or the rail system 108. The wheels 6 may be propelled by a suitable drive motor placed for example within the chassis 3. Alternatively, or in addition, the wheels 6 may be propelled by drive motors arranged at or within one or more of the wheels 6, for example a hub motor. The drive motor may be a DC (direct current) motor, such as a brushless DC motor.

In yet another alternative or additional configuration, the movement of the service vehicle 2 may be achieved by external systems such as traction cables running across the rail system. This alternative configuration may remove the need of a motorized propulsion system 6, allowing use of passive wheels such as trolley wheels.

An upper portion 4 may be mounted on top of the chassis 3 of each driving units 21,22. The upper portions of each driving units 21,22 may comprise a rectangular shape base 4*a* extending parallel to the top surface of the at least one chassis of the driving units.

FIG. 9-11 show a possible configuration where each driving units 21,22 comprises two chassis 3 with wheels 6*a*,6*b*. In this configuration each chassis 3 with wheels 6*a*,6*b* has a footprint covering 1×1 grid cell 122. As shown in FIG. 9-11 an upper portion 4 is mounted on top and is connecting the two chassis 3 with wheels 6a,6b of each driving units 21,22, such that the each driving unit 21,22 have footprint covering 1×3 grid cells 122.

The service vehicle 2 and driving unit 21,22 may have different configuration and different footprint. Preferably, the driving units 21,22 have a footprint extending over several grid cells 122, such as 1×4 or 2×3 grid cells 122, but other footprint configurations may also be used.

The service vehicle 2 may further comprise a beam 30 mounted on top of each base 4a of the driving units. As shown in FIG. 9-11, the driving units 21,22 are coupled to two opposite vertical sides of the container handling vehicle part 5 via a beam 30 mounted on top of each base 4a of the driving units. Preferably, the beams 30 are arranged at a parallel side of the base 4a horizontal perimeter of each driving units 21,22, and preferably nearest the vertical centerplane of the service vehicle. The beams 30 may advantageously reinforce the structure of the service vehicle and making it more safe to lift heavy container handling vehicle 200,300.

In the fourth embodiment, as shown in FIGS. 9-11, the container handling vehicle part 5 comprises a hoist arrangement 8 connected to a displacement mechanism 10 (not shown), for lifting up and down the container handling vehicle 200,300 within the contain handling vehicle part 5.

The mechanism 10 may be an operating system remotely located, hence regulating the direction and the speed of the service vehicle 2 by remote control system.

Further the mechanism 10 may also allow for the control of the vertical displacement of the hoist arrangement 80 alone or of the hoist arrangement 8 with the container handling vehicle 200,300 to be serviced and/or inspected and/or transferred. The mechanism 10 may also allow for the control and regulation of the speed of the hoist arrangement 8 including start and full halt.

The service vehicle 2 may further comprise a transmitter and/or receiver for establishing signal communication with a remote control system.

In the fourth embodiment, the hoist arrangement 8 includes at least one framing plate 81 arranged parallel to at least one vertical side of the container vehicle handling part 5 and connected to a rail 82 mounted vertically on the edge of the container handling vehicle part 5, a transfer motor 83 connected to framing plate 81 and an attachment device 84 operationally connected to the transfer motor 83.

Figure 12:
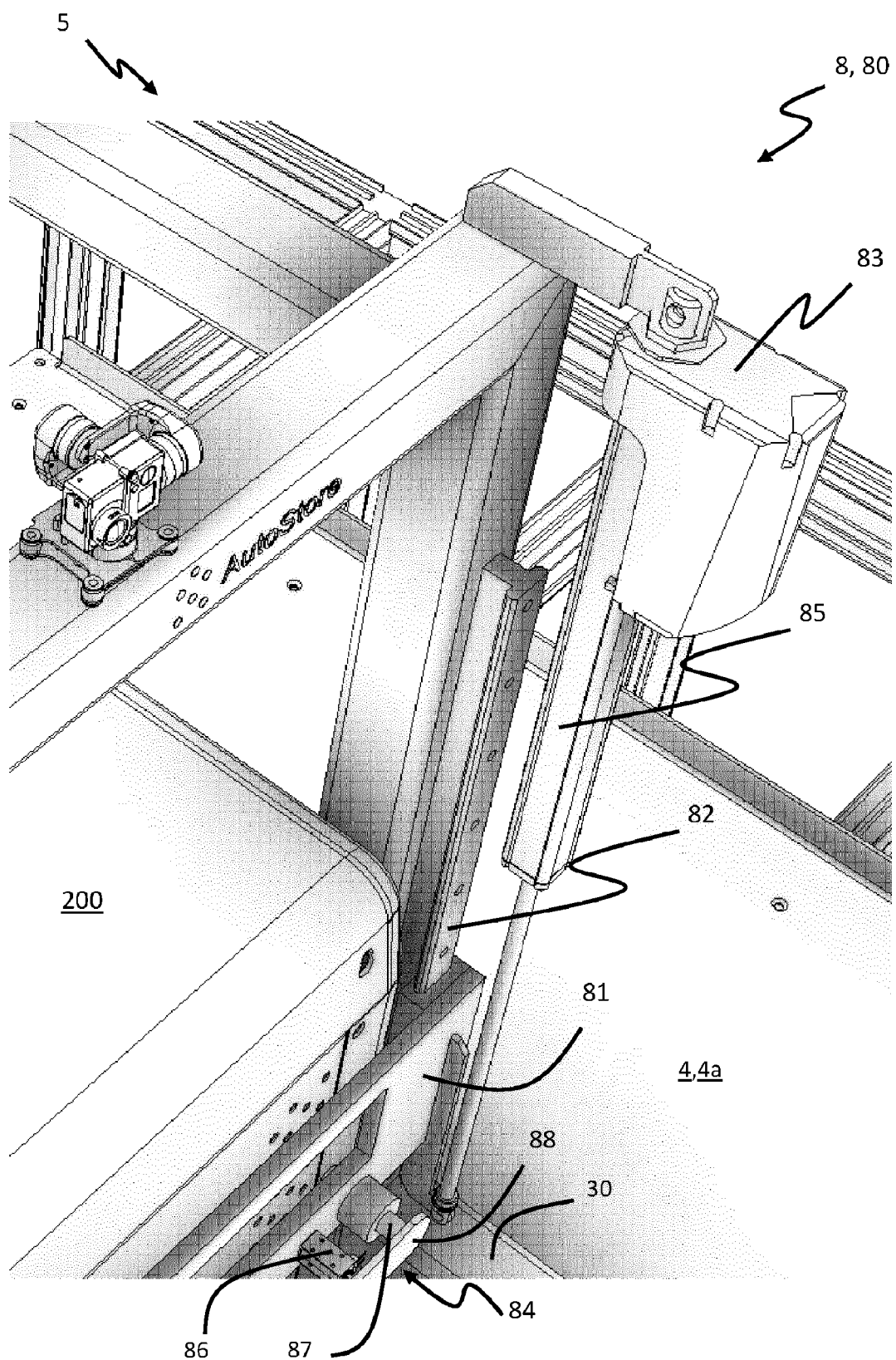
FIG. 12 shows a perspective and detailed view of the hoist arrangement according to the fourth and fifth embodiment of the invention.

In the particular embodiment shown in FIG. 9-11 a hoist arrangement 8 with two framing plates 81 is used. A detail view of the hoist arrangement used in the embodiment of FIGS. 9-11 is shown in FIG. 12.

The two framing plates 81 are arranged at two opposite vertical sides of the container handling vehicle part 5 and parallel to the vertical sides. In FIGS. 9-11 and 12 the framing plates 81 are arranged in vertical planes perpendicular to the vertical centreplane of the service vehicle.

Each framing plate 81 is movably connected at both end to the rail 82 mounted on two vertical edges of the container vehicle handling part 5. Each of the two framing plates 81 is connected at each end to one end of one linear actuator 85 arranged vertically and parallelly to the vertical side of the container handling vehicle part 5 to which the framing plates 81 is attached to. The other ends of the linear actuators 85 are attached to the top corners of the vertical edges.

This configuration of the transfer motors 83 with the linear actuator makes it possible to drive the framing plates 81 up and down along the vertical sides of the container vehicle handling part 5.

Further, the attachment device 84 is arranged on each the framing plates and include an electromagnetic coil 86 and pins 87 connect in parallel to a bar 88. As the electromagnetic coil 86 is powered on/off it pressures in/out the pins into/out from openings/slots in the container vehicle 200, 300.

In the particular embodiment shown in FIGS. 9-14, the gripping mechanism may be removably attached to the container vehicle 200,300 via the pins, such that the vehicle 200,300 may be lifted up and down by operating the motor and linear actuator. However, a skilled person will understand that any mechanism capable of raising and lowering a container handling vehicle 200,300 relative to the rail 82 may be applied, such as for example a pinching mechanism which may pressure le framing plates 81 against the container vehicle 200,300 vertical side to lift it up and down.

In another alternative configuration, the attachment device 84 may be screws as shown in FIG. 9, FIG. 11, FIG. 13C and FIG. 14, or other means evident to the skilled person.

By the arrangement of the framing plate the particular embodiment shown in FIGS. 9-11 is particularly suited for receiving and lifting up and down a container vehicle 200. Alternatively, the framing plates 81 may be arranged at opposite vertical side of the container vehicle handling part 5 in a vertical plane parallel to the vertical centreplane of the container vehicle handling part 5, thereby parallel to the driving units 21,22, such a configuration may be useful for servicing and/transferring container vehicle of type 300 having a protruding part.

Figure 13A:
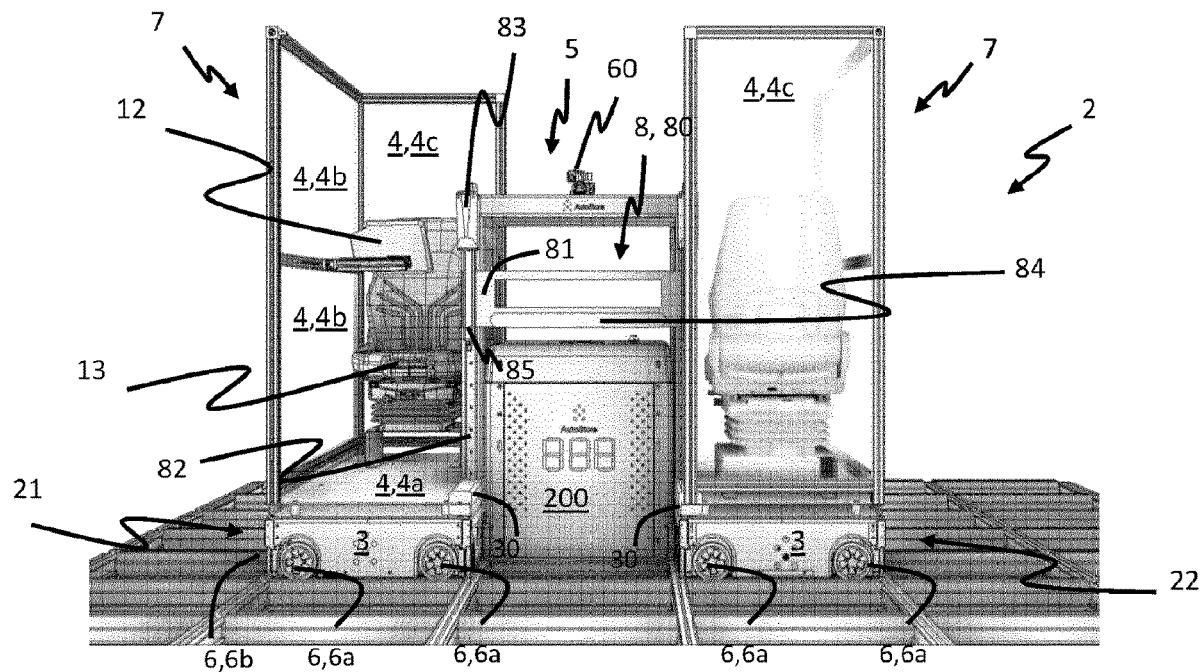
FIG. 13A-C show a perspective view of a service vehicle according to the fifth embodiment of the invention, where
Figure 13B:
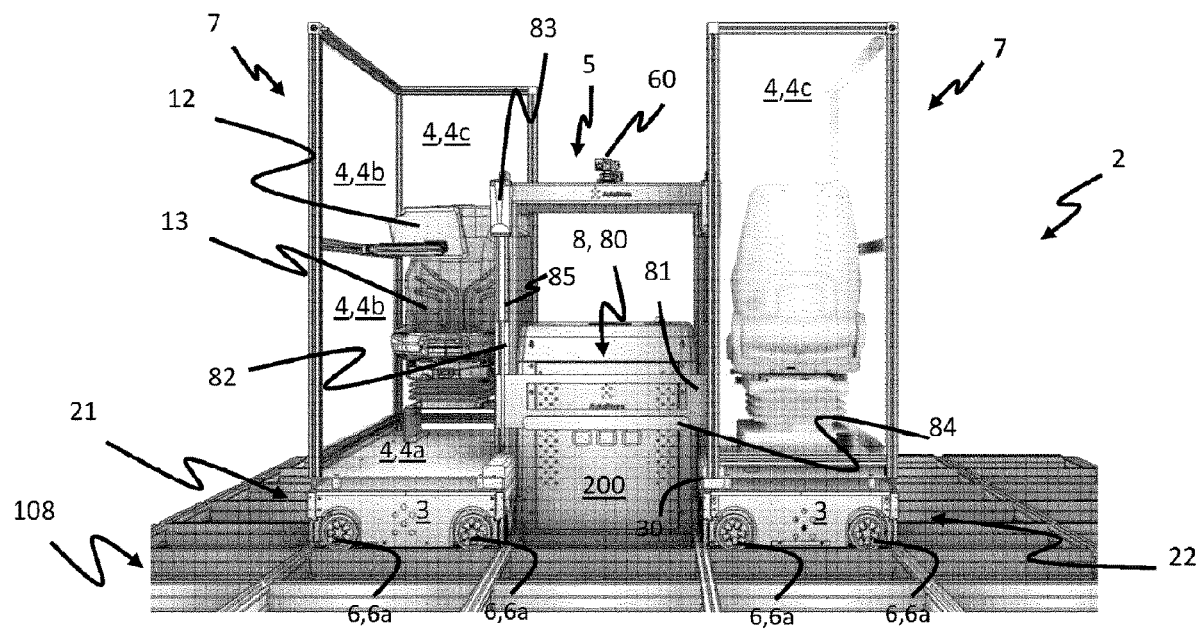
Figure 14:
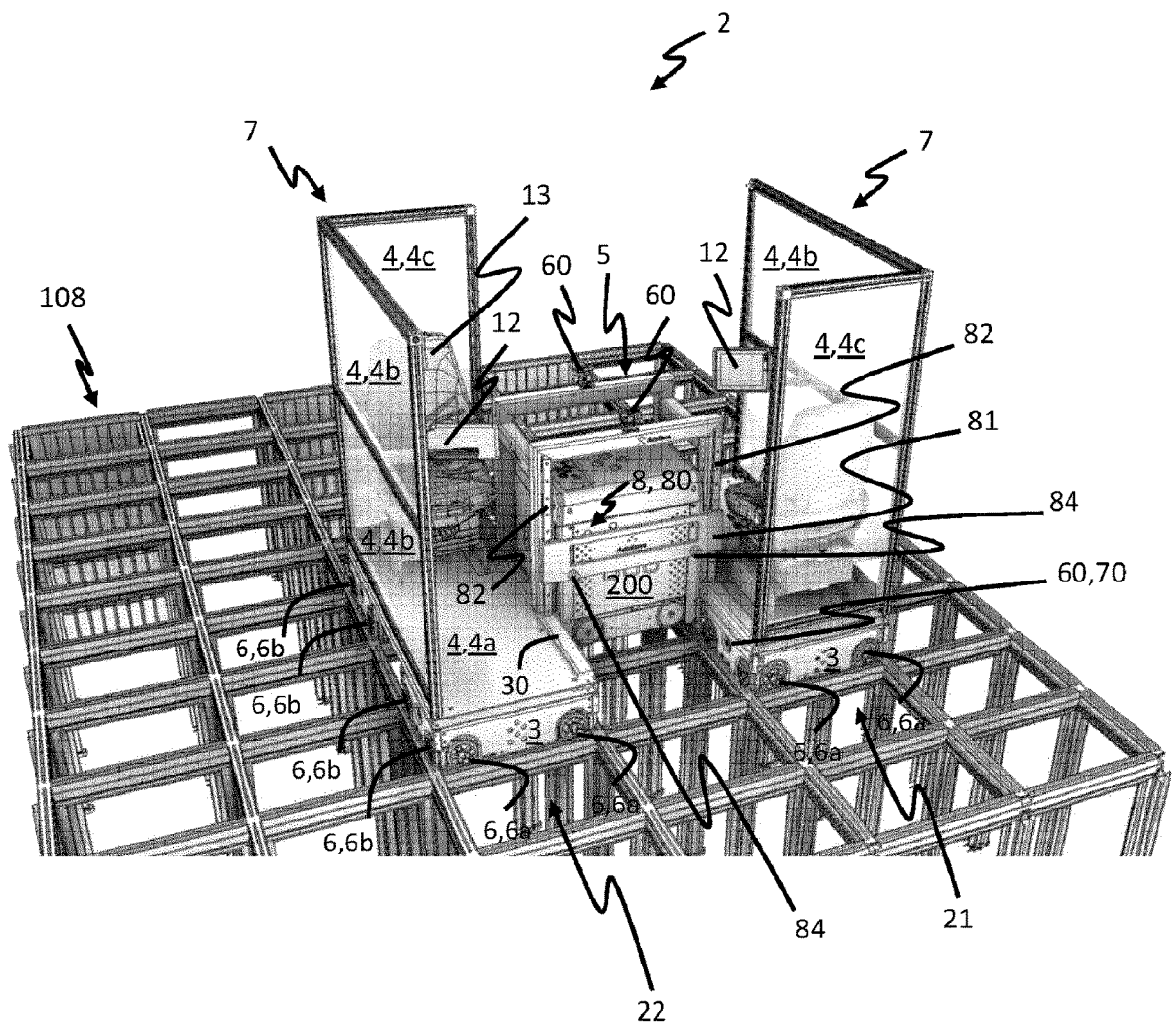
FIG. 14 shows a perspective view of the service vehicle of FIG. 13 viewed side way from above and where the service vehicle is raising the container handling vehicle above the rail system by used of its hoist mechanism.

FIGS. 13A-B and FIG. 14 show the fifth fourth embodiment of the service vehicle 2 having a similar configuration as the fourth embodiment but where the upper portion of each driving units 21,22 further comprises a cab-area 7. In this embodiment, the operation of the service vehicle 2 are preferably performed by a human operator located onboard the service vehicle 2 when in use and who directly interact with a control system 12 to operate the service vehicle. Alternatively, the service vehicle may be remotely controlled.

In the fifth embodiment, as shown in FIGS. 13 and 14, the upper portion of each driving units 21,22 further comprises a vertical side walls/guards/rails/panels 4b arranged at a parallel side of the base 4a horizontal perimeter and a vertical rear wall/guard/rail/panel 4c arranged at one of the other parallel side of the base's 4a horizontal perimeter.

An operator chair 13a,13b may be installed in the cab area 7 of each driving units 21,22 to allow the operator 50 to be seated during transport when the service vehicle is in use on the rail system 108. The cab areas 7 may cover the whole or a partial area of the base 4a.

The two driving units 21,22 with the cab area are preferably identical, as in the fourth embodiment FIG. 13 and FIG. 14, to increase stability of the service vehicle 2.

The upper portion 4,4a of each driving unit may extends higher above the chassis/wheels relative to the first and second embodiment such that the walls/guard/rail/panel can provide sufficient safety to an operator 50 standing or sitting in the cab area 7 when the service vehicle 2 is in use.

By the arrangement of the first and second driving unit 21,22 the service vehicle 2 is arranged to move horizontally on the rail system 108 by a control system 12 located onboard the service vehicle 2 as shown in FIGS. 13 and 14, or remote from the service vehicle 2. If the control system 12 is onboard the service vehicle 2, any movement pattern and speed settings may be conducted by any operator 50 located inside the service vehicle 2 by the operation of the driving units 21,22 via its/their motor(s).

Figure 13C:
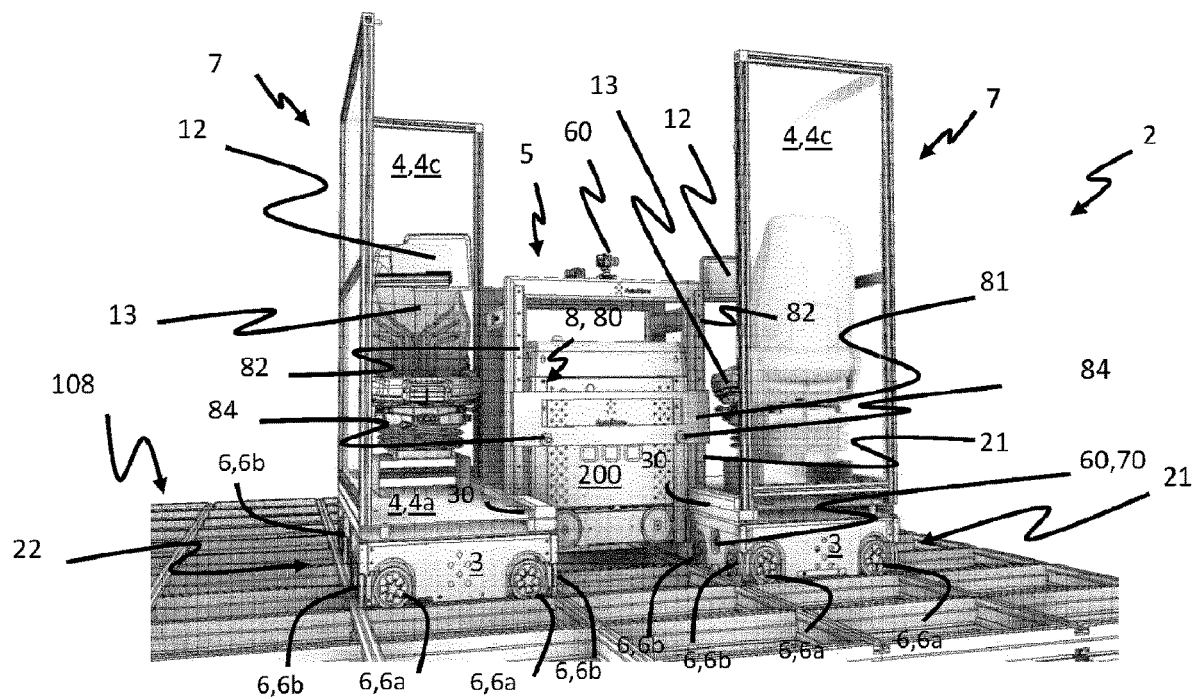

FIG. 13A shows the service vehicle 2 (operator 50 not shown) of the fifth embodiment surrounding a container handling vehicle 200 to be serviced. FIG. 13B shows the service vehicle 2 gripping the container handling vehicle 200 by use of its hoist arrangement 8 as described in detail in the fourth embodiment. FIG. 13C shows the service vehicle raising the container handling vehicle 200 above the rail system 108 by use of its hoist arrangement 8.

FIG. 14 shows a perspective view of the service vehicle 2 of FIG. 13 viewed side way from above and where the service vehicle 2 is raising the container handling vehicle 200 above the rail system 108 by used of its hoist arrangement 8.

Further, all service vehicles 2 may be equipped with image capturing units such as a forward and/or rearward camera 60 as best illustrated in FIG. 9-14. The image capturing unit may be any optical instrument for recording or capturing images. The images or films may be stored locally on an onboard data storage unit, transmitted to another location, or a combination thereof.

The image capturing unit may be controlled and visualized by an operator 50 onboard the service vehicle 2, visualized on a remotely located monitor, or a combination thereof.

Further, as shown in FIG. 9-14, all service vehicle 2 may have an emergency stop button 70 acting on the wheels 6. If the hoist arrangement 8 and/or the displacement mechanism 10 is motorized, the same or other emergency stop buttons may act on all or each of these.

In the preceding description, various aspects of the service vehicle and the storage system according to the invention have been described with reference to the illustrative embodiment. For purposes of explanation, specific numbers, systems and configurations were set forth in order to provide a thorough understanding of the service vehicle and its workings. However, this description is not intended to be construed in a limiting sense. Various modifications and variations of the illustrative embodiments, as well as other embodiments of the service vehicle, which are apparent to persons skilled in the art to which the disclosed subject matter pertains, are deemed to lie within the scope of the present invention.

REFERENCE NUMERALS

1 Storage and retrieval system/storage structure
2 Service vehicle
3 Chassis/stationary part of service vehicle 2
4 Upper portion/security fence/rotational part of the service vehicle 2
4a Base/base panel of the upper portion 4
4a' Container handling vehicle base
4a" Cab floor
4b Side wall/side panel of the upper portion 4
4c Rear wall/rear panel of the upper portion 4
4d Inspection door
4e Inner separation wall
4f Inner access door
4g Stop beam for displacement mechanism 10
5 Container vehicle handling part
6 Propulsion means/propulsion mechanism/wheel arrangement/wheels
6a First set of wheels, X-wheels
6b Second set of wheels, Y-wheels
6c Lifting mechanism for wheel arrangement/
7 Cab-area
8 Hoist arrangement
8a Attachment device/lifting claw
8b Lifting line
8c Transfer motor/crank handle
8d Transfer drum
8e Transfer column
8f Transfer sliding plate
9 Drive components
10 Displacement mechanism for hoist arrangement 8
10a First displacement beam directed along displacement direction
10b Second displacement beam directed perpendicular to displacement direction
10c Displacement mechanism handle
10d Displacement mechanism brake
10e Displacement mechanism wheels
11 Support beam
12 Control system
13 Operator chair
21 First driving unit
22 Second driving unit
40 Beam
50 Operator/personnel/person
60 Camera
70 Emergency button
80 Gripping mechanism
81 Framing plate
82 Rail
83 Transfer motor
84 Attachment mechanism
85 Linear actuator
86 Electromagnetic coil
87 Pin
88 Bar
100 Grid framework
102 Upright members of framework structure
103 Horizontal members of framework structure
104 Storage grid/three dimensional grid
105 Storage column
106 Storage container
107 Stack
108 Rail system
110 First set of parallel rails in first direction (X)
111 Second set of parallel rails in second direction (Y)
115 Grid opening
119 Drop-off port column
120 Pick-up port column
122 Grid cell
200 First container handling vehicle
201 Wheel arrangement
300 Second container handling vehicle
301 Wheel arrangement
X First direction
Y Second direction
P Horizontal plane

The invention claimed is:

1. A service vehicle for movement on a rail system comprising a first set of parallel rails arranged in a horizontal plane and extending in a first direction and a second set of parallel rails arranged in the horizontal plane and extending in a second direction which is orthogonal to the first direction, wherein the first set of parallel rails and the second set of parallel rails form a grid pattern in the horizontal plane comprising a plurality of adjacent grid cells,
the service vehicle comprising:
a chassis and an upper portion mounted on top of the chassis, wherein the service vehicle is divided into a first part relative to a horizontal extent of the upper portion and a second part relative to the horizontal extent of the upper portion, wherein the first part is a container handling vehicle part including one or more components configured for mechanically interacting with a container handling vehicle to be serviced, the container handling vehicle part configured for storing the container handling vehicle operating on the rail system in a loaded position, and wherein the second part is a cab-area configured to contain one or more persons;
wheels for allowing movement of the service vehicle along the rail system during operation,
a displacement mechanism, and
a hoist arrangement connected to the displacement mechanism and configured to be releasably fixed to the container handling vehicle,
wherein the displacement mechanism and the hoist arrangement are configured for moving the container handling vehicle between an operational position on the rail system and the loaded position within the container handling vehicle part.

2. The service vehicle in accordance with claim 1, wherein
the wheels are rotationally connected to the chassis, and
the upper portion at least partly encloses a space above the chassis.

3. The service vehicle in accordance with claim 2, wherein a horizontal area of the at least partly enclosed space above the chassis is equal to or within a total horizontal extent set up by the chassis and the wheels.

4. The service vehicle in accordance with claim 2, wherein the upper portion comprises a base configured to support the container handling vehicle.

5. The service vehicle in accordance with claim 2, wherein the service vehicle further comprises:
a rotatable connection interconnecting the upper portion and the chassis, thereby allowing the upper portion to rotate relative to the chassis.

6. The service vehicle in accordance with claim 2, wherein the upper portion comprises:
a base comprising a container handling vehicle base configured to support the container handling vehicle and a cab floor configured to contain at least one adult person in an upright position,
side walls, and
a rear wall attached to the side walls,
wherein the side walls and the rear wall enclose a space in the horizontal plane covering at least the cab floor.

7. The service vehicle in accordance with claim 6, wherein at least one of the side walls and the rear wall comprises an at least partly a transparent panel.

8. The service vehicle in accordance with claim 2, wherein the upper portion comprises an inspection door allowing an operator within the upper portion direct access to the rail system during operation.

9. The service vehicle according to claim 2, wherein the service vehicle comprises two driving units spaced apart from one another, forming a space for receiving a container handling vehicle between them and being connected to each other via the container handling vehicle part.

10. The service vehicle according to claim 9, wherein the two driving units are identical and arranged symmetrically relative to the container handling vehicle part.

11. The service vehicle according to claim 9, wherein the hoist arrangement comprises at least two framing plates configured to be moved down along two opposite sides of the container handling vehicle part, and wherein the at least two framing plates comprise an attachment mechanism for connection to the container handling vehicle.

12. The service vehicle in accordance with claim 1, wherein the hoist arrangement comprises an attachment device configured to be releasably fixed to the container handling vehicle arranged on the rail system.

13. The service vehicle in accordance with claim 12, wherein the attachment device comprises a lifting claw.

14. The service vehicle in accordance with claim 13, wherein the lifting claw is configured such that a distance from one end of the lifting claw to an other end of the lifting claw in a fully open position corresponds at least to a minimum horizontal extent of one container handling vehicle operating on the rail system.

15. The service vehicle in accordance with claim 1, wherein
the wheels are rotationally connected to the chassis, and
the upper portion at least partly encloses a space above the chassis, and
wherein the service vehicle further comprises:
a support beam fixed to the upper portion,
wherein the displacement mechanism is connected to be movable along the support beam, thereby allowing the hoist arrangement to be displaced between:
the operational position where an attachment device is located above the container handling vehicle to be transferred, and
the loaded position where the attachment device is located within the container handling vehicle part.

16. The service vehicle in accordance with claim 15, wherein the displacement mechanism comprises:
two first displacement beams directed along a longitudinal direction of the support beam, and
a second displacement beam fixed as a crossbeam to the two first displacement beams,
wherein the hoist arrangement is connected to the second displacement beam.

17. The service vehicle in accordance with claim 1, wherein the displacement mechanism is configured for being displaced in the horizontal plane relative to the wheels.

18. The service vehicle in accordance with claim 1, wherein the wheels comprise:
a first set of wheels for engaging with the first set of parallel rails to guide movement of the service vehicle in the first direction,
a second set of wheels for engaging with the second set of parallel rails to guide movement of the service vehicle in the second direction, and
a lifting mechanism configured to lift the first set of wheels relative to the second set of wheels.

19. The service vehicle according with claim 1, wherein the service vehicle is remotely operated.

20. An automated storage and retrieval system comprising:
a rail system comprising a first set of parallel rails arranged in a horizontal plane and extending in a first direction and a second set of parallel rails arranged in the horizontal plane and extending in a second direction which is orthogonal to the first direction, wherein the first set of parallel rails and the second set of parallel rails form a grid pattern in the horizontal plane comprising a plurality of adjacent grid cells; and the service vehicle as claimed in claim 1.

21. The automated storage and retrieval system according to claim 20, wherein the service vehicle covers n×m grid cells of the rail system, where n and m are integers of at least 2.

22. A method for operating the service vehicle as claimed in claim 1, wherein the method comprises:

guiding the service vehicle to a first position on the rail system adjacent to at least one storage container vehicle by controlling the wheels, and operating the hoist arrangement and the displacement mechanism to move the container handling vehicle between the operational position on the rail system and the loaded position within the container handling vehicle part.

23. The method in accordance with claim 22, wherein the method further comprises a step of guiding the service vehicle to a predetermined second position on the rail system.

* * * * *